(12) United States Patent
Nguyen et al.

(10) Patent No.: US 12,483,601 B2
(45) Date of Patent: Nov. 25, 2025

(54) AUTOMATION OF CLOUD NETWORK SECURITY POLICY ANALYSIS AND DEPLOYMENT

(71) Applicant: salesforce.com, inc., San Francisco, CA (US)

(72) Inventors: Toan Van Nguyen, Singapore (SG); Qiyuan Zheng, Sammamish, WA (US); Santhosh Ram Vetrinadar Manohar, San Jose, CA (US); Varun Kulkarni Somashekhar, Fremont, CA (US); Prabhat Singh, Sunnyvale, CA (US)

(73) Assignee: Salesforce, Inc., San Francisco, CA (US)

( * ) Notice: Subject to any disclaimer, the term of this patent is extended or adjusted under 35 U.S.C. 154(b) by 1068 days.

(21) Appl. No.: 17/248,529

(22) Filed: Jan. 28, 2021

(65) Prior Publication Data

US 2022/0086193 A1 Mar. 17, 2022

Related U.S. Application Data

(63) Continuation-in-part of application No. 16/948,399, filed on Sep. 16, 2020, now Pat. No. 12,170,692.

(51) Int. Cl.
*H04L 9/40* (2022.01)

(52) U.S. Cl.
CPC ................................. *H04L 63/205* (2013.01)

(58) Field of Classification Search
CPC ........................... H04L 63/20; H04L 41/0894
See application file for complete search history.

(56) References Cited

U.S. PATENT DOCUMENTS

| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |

(Continued)

FOREIGN PATENT DOCUMENTS

| CN | 104506487 B | 12/2017 |
| EP | 3611619 A1 | 2/2020 |

(Continued)

OTHER PUBLICATIONS

"Rightscale 2019 State of the Cloud Report" Flexera, 2019.

(Continued)

*Primary Examiner* — Alexander Lagor
*Assistant Examiner* — Shu Chun Gao
(74) *Attorney, Agent, or Firm* — Weaver Austin Villeneuve & Sampson LLP

(57) ABSTRACT

Disclosed are examples of systems, apparatus, methods and computer program products for automation of network security policy analysis and deployment. A server system can obtain a system input comprising two versions of a policy output. The system can generate a severity characteristic that indicates a severity of deploying the second version of the policy output. The system can then determine whether to deploy the second version of the policy output based on the severity characteristic. The system can then, in response to determining that the second version of the policy output is to be deployed, deploy the second version of the policy output to one of a plurality of clouds.

20 Claims, 28 Drawing Sheets

(56) References Cited

U.S. PATENT DOCUMENTS

| | | |
|---|---|---|
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,082,102 B1 | 7/2006 | Wright |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,484,237 B2 | 1/2009 | Joly et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,307,404 B2 | 11/2012 | Vinberg et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 10,404,757 B1 | 9/2019 | Horton |
| 12,170,692 B2 | 12/2024 | Nguyen et al. |
| 12,170,693 B2 | 12/2024 | Nguyen |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |

(56) References Cited

U.S. PATENT DOCUMENTS

| | | |
|---|---|---|
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0188072 A1 | 8/2005 | Lee et al. |
| 2005/0198098 A1 | 9/2005 | Levin et al. |
| 2005/0257244 A1 | 11/2005 | Joly et al. |
| 2007/0156919 A1 | 7/2007 | Potti et al. |
| 2007/0282951 A1 | 12/2007 | Selimis et al. |
| 2008/0060051 A1* | 3/2008 | Lim .................. G06F 16/93 726/1 |
| 2008/0249972 A1 | 10/2008 | Dillon |
| 2008/0256593 A1 | 10/2008 | Vinberg et al. |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0079266 A1 | 3/2012 | Ogata et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0019617 A1* | 1/2014 | Hadar ................ H04L 63/20 709/225 |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0169879 A1 | 6/2015 | Hagiuda et al. |
| 2015/0172563 A1 | 6/2015 | Jakobson et al. |
| 2017/0251013 A1 | 8/2017 | Kirti et al. |
| 2017/0339003 A1 | 11/2017 | Åström et al. |
| 2017/0339023 A1 | 11/2017 | Åström et al. |
| 2019/0007443 A1 | 1/2019 | Cook et al. |
| 2019/0068598 A1 | 2/2019 | Kang et al. |
| 2019/0098037 A1 | 3/2019 | Shenoy, Jr. et al. |
| 2019/0158617 A1 | 5/2019 | Åström et al. |
| 2019/0289058 A1* | 9/2019 | Bhoj ................ G06Q 10/06375 |
| 2019/0306194 A1 | 10/2019 | Benson et al. |
| 2019/0312909 A1 | 10/2019 | Kulkarni et al. |
| 2020/0004742 A1* | 1/2020 | Nagarajan ............ G06F 16/248 |
| 2020/0059420 A1 | 2/2020 | Abraham |
| 2020/0128047 A1 | 4/2020 | Biswas et al. |
| 2020/0278813 A1 | 9/2020 | Nilsson |
| 2020/0382560 A1 | 12/2020 | Woolward et al. |
| 2021/0144550 A1 | 5/2021 | Ito et al. |
| 2021/0314363 A1 | 10/2021 | Hensley et al. |
| 2021/0336929 A1 | 10/2021 | Moore et al. |
| 2022/0006842 A1 | 1/2022 | Wadhwa et al. |
| 2022/0383154 A1* | 12/2022 | Eberlein .................. G06N 5/04 |
| 2025/0047719 A1 | 2/2025 | Nguyen et al. |

FOREIGN PATENT DOCUMENTS

| | | |
|---|---|---|
| JP | 5346010 B2 | 11/2013 |
| WO | WO-2017138944 A1 | 8/2017 |

OTHER PUBLICATIONS

"All Data Breaches in 2019 & 2020—An Alarming Timeline" *SelfKey Blog,* Jul. 5, 2020.

Shahin, Mojtaba, Muhammad Ali Babar, and Liming Zhu. "*Continuous integration, delivery and deployment: a systematic review on approaches, tools, challenges and practices.*" IEEE Access 5 (2017): 3909-3943.

Spinnaker: Cloud Native Continuous Delivery: Fast, safe, repeatable deployments for every Enterprise, Webpage, Accessed: Jan. 20, 2021.

"Google Plus Users", Google+Ripples, Oct. 31, 2011 [retrieved on Feb. 21, 2012 from Internet at http://www.googleplusers.com/google-ripples.html], 3 pages.

U.S. Appl. No. 16/948,399, filed Sep. 16, 2020, Toan Van Nguyen, et al.

U.S. Appl. No. 17/248,347, filed Jan. 21, 2021, Toan Van Nguyen.

International Preliminary Report on Patentability dated Mar. 30, 2023, in PCT Application No. PCT/US2021/049484.

International Search Report and Written Opinion dated Dec. 3, 2021, in Application No. PCT/US2021/049484, 13 pages.

U.S. Final office Action dated Jul. 6, 2023 in U.S. Appl. No. 16/948,399.

U.S. Non-Final office Action dated Jan. 23, 2023 in U.S. Appl. No. 16/948,399.

U.S. Non-Final Office Action dated Mar. 12, 2024 in U.S. Appl. No. 17/248,347.

U.S. Non-Final Office Action dated Nov. 28, 2023 in U.S. Appl. No. 16/948,399.

U.S. Notice of Allowance dated Aug. 1, 2024 in U.S. Appl. No. 16/948,399.

U.S. Notice of Allowance dated Aug. 21, 2024 in U.S. Appl. No. 17/248,347.

U.S. Corrected Notice of Allowance dated Nov. 20, 2024 in U.S. Appl. No. 16/948,399.

\* cited by examiner

```
{
  {
    "datacenter": "datacenter1",  ← 304
    "functional_domains": {
      [
        {
          "name": "fd1",
          "sfdc_security_groups": [
            {
              "k8s_cluster_names": [
                "logging",
                "monitoring"
              ],
              "name": "Logging_Monitoring",  ← 308
320 →       "policies": [
              {
324 →           "destination": {
                  "services": ["proxy"]
                  "groups": ["Processing"]
                },
328 →           "source": {
                  "services": ["all"]
                }
              },
              {
332 →           "destination": {
                  "services": ["service1", "service2", "service3"]
                },
336 →           "source": {
                  "services": [
                    "service4",
                    "service5",
                    "service6",
                    "service7",
                    "service8"
                  ]
                }
              }
            ],
340 →     "public": false,
342 →     "security_group_cidr": "10.0.0.0/12",
344 →     "security_group_functionality": "Logging_Monitoring",
          "security_group_name": "DC.Test.Logging_Monitoring",
348 →     "service_name": [
```

Figure 3A

```
            "service4",
            "service5",
            "service6",
            "service7",
            "service8",
            "service9",
            "service10"
         ],
         "service_instances": [
            {
               name: "service4",
               port:  8080,
               protocol: "tcp"
            },
            ...
         ]
      },
      {
         "name": Processing,  ─── 312
         "security_group_cidr": "10.16.0.0/12",
         "security_group_functionality": "Processing",
         "security_group_name": "DC.Test.Processing",
         "service_name": [
            "service1",
            "service2",
            "service3"
         ],
         "service_instances": [
            {
               "name": "service1",
               "port": 443,
               "protocol": "tcp"
            },
            {
               "name": "service2",
               "port": 587,
               "protocol": "udp"
            },
            {
               "name": "service3",
               "port": 80,
               "protocol": "tcp"
            }
         ]
      },
      {
```

Figure 3A (Cont.)

```
            "name": Gateway, ─── 316
            "service_name": [
              "proxy"
            ],
            "service_instances": [
              {
                "name": "proxy",
                "port": 8443,
                "protocol": "tcp"
              }
            ]
          }
        ]
      },
      {
        "name": "fd2",
        ...
      }
    ]
  }
}
```

Figure 3A (Cont.)

```
                    security_group: DC.Test.Logging_Monitoring   ─ 350
                       - subnet: 10.0.0.0/12   ─ 352
                          - service_name:  ─ 354
                             - "service4",
                             - "service5",
                             - "service6",
                             - "service7",
                             - "service8",
                             - "service9",
                             - "service10"
                    public:false   ─ 356
                    policies:
                    - description: Policy allowing DC.Test.Logging_Monitoring to
                      DC.Test.Processing   ─ 358
                         communication
        362  ─   source:
                         securityGroup: DC.Test.Logging_Monitoring
        364  ─   destination:
                         securityGroup: DC.Test.Processing
        366  ─   services:
                      - description: tcp443/service1  ─ 368
                        protocol: tcp  ─ 372
        370  ─   destPorts: '443'
                      - description: service2
                        protocol: udp
                        destPorts: '587'
                      - description: service3
                        protocol: tcp
                        destPorts: '80'

- description: Policy allowing DC.Test.Logging_Monitoring to
                      DC.Test.Gateway  ─ 360
                         communication
                      source:
                         securityGroup: DC.Test.Logging_Monitoring
                      destination:
                         securityGroup: DC.Test.Gateway
                      services:
                      - description: proxy
                        protocol: tcp
                        destPorts: '8443'
```

Figure 3B

```
- root ─── 424
   - DC Instance ─── 420                              ── 400
      - name: datacenter1                         404
      - Functional Domain (an independent chunk of network)
         - name: fd1
            - Security Group: Processing ─── 412
               - Subnet: 10.16.0.0/12
               - Services ─── 452
                  - service1
                  - service2
                  - service3
               - Ingress rules ─── 428
                  - tcp_443 (rule name) ─── 436
                     - port: 443 ─── 440
                     - protocol: tcp, udp ─── 444
                     - source: [10.0.0.0/12, 10.32.0.0/12] ─── 448
                  - udp_587
                     - port: 587
                     - protocol: udp
                     - source: [10.0.0.0/12]
               - Egress rules ─── 432
                  - allow_all ─── 456
                     - port: 1-65355
                     - protocol: tcp, udp
                     - destination: [10.0.0.0/12, 8.8.8.8/32]

- Security Group: Logging_Monitoring ─── 416
               - Subnet: 10.0.0.0/12
               - Services
                  - service4
                  - service5
                  ...
               - Ingress rules
               - Egress rules
            - Security Group: Gateway
               - Subnet: 10.0.0.0/12
               - Services
                  - proxy
               - Ingress rules
                  - tcp_8443
                     - port: 8443
                     - protocol: tcp, udp
                     - source: [10.0.0.0/12]
               - Egress rules
```

Figure 4A

- Functional Domain —— 408
    - name: fd2
    - Security Group: Processing
    ...
- DC Instance
  - name: datacenter2
  ...

Figure 4A (Cont.)

```
                                                              508                         500A
                                                               /                         /
  504 ──── resource "aws_security_group" "dc_test_processing_fd1" {
              count        = "${var.fd_name == "datacenter1_fd1" ? 1 : 0 }"
              description  = "Security Group for Processing"
  512 ──── name         = "dc_test_processing_fd1"
              vpc_id       = "${var.vpc_id}"

516 ──── tags = "${merge(var.platform_mandatory_tags,map(
                 "Processing", "true",
                 ))}"

lifecycle {
                ignore_changes = ["description"]
              }
           }

520 ──── resource "aws_security_group_rule" "dc_test_processing_fd1_tcp_443"
           {
              count        = "${var.fd_name == "datacenter1_fd1" ? 1 : 0 }"
              description  = "Policy from Logging_Monitoring to Processing on
              tcp_443"
              ┌ type         = "ingress"
              │ from_port    = 443
  524 ───┤ to_port      = 443
              │ protocol     = "tcp"
              └ cidr_blocks  = ["10.0.0.0/12"]
  528 ──── security_group_id =
           "${aws_security_group.dc_test_processing_fd1.id}"
           } resource "aws_security_group_rule"
           "dc_test_processing_fd1_udp_587" {
              count        = "${var.fd_name == "datacenter1_fd1" ? 1 : 0 }"
              description  = "Policy from Logging_Monitoring to Processing on
              udp_587"
              type         = "ingress"
              from_port    = 587
              to_port      = 587
              protocol     = "udp"
              cidr_blocks  = ["10.0.0.0/12"]
              security_group_id =
           "${aws_security_group.dc_test_processing_fd1.id}"
           }
           ...
```

Figure 5A

```
                                                          500B
       resource "google_compute_firewall"
534    "Policy_from_dc-test-logging_monitoring_to_dc-test-processing" {
           count    = "${var.fd == "dc_test_processing_fd1" ? 1 : 0 }"
538        name     = "rule-1"
           network  = "${var.vpc}"
           project  = "${var.project}"
           priority = 10000
542        direction = "INGRESS"

546        allow {
               protocol = "tcp"
550            ports    = ["80", "443",]
           }

554        allow {
               protocol = "udp"
               ports    = ["587"]
           }

558        deny {
               protocol = "udp"
               ports    = ["53", "161"]
           } target_tags   = ["dc-test-processing"]
           source_tags   = ["dc-test-logging-monitoring"]
           source_ranges = ["10.0.0.0/12"]
       } vpc {
       name: processing
       tag:   dc-test-processing
       subnet:        10.16.0.0/12
       }
```

Figure 5B

```
{
    "name": Security_Group_2,
    "security_group_cidr": "10.16.0.0/12",
    "service_name": [
        "service11",              ← 1002
        "service2",
        "service3",               ← 1006
        "service14"
    ],
    "service_instances": [
        {
            "name": "service11",
            "port": 443,           ← 1004
            "protocol": "tcp"
        },
        {
            "name": "service2",
            "port": 587,
            "protocol": "udp"
        },
        {
            "name": "service3",
            "port": 80,
            "protocol": "tcp"
        }
        {
            "name": "service14",
            "port": 8000,          ← 1008
            "protocol": "tcp"
        }
    ],
    {
    "policies": [                  ← 1010
            "destination": {
                "services": ["service8"]
            },
            "source": {
                "services": ["service14"]
            }
        ],
    },
},
```

Figure 10A

```
{
  "datacenter": "datacenter1"                                    1050
  "business_units": {
  [
    {
                     1051
      "name": "bu1"
      "changes": {
      [
        {                    1052
          "Type": "Service Removed"
          "Path": "dc1.bu1.Security_Group_2.service11"
          "RemovedResource": "service1"
          "Severity": "High"      1054
                                                                 1056
          "Corresponding output changes": "
            - resource "aws_security_group_rule"
  "dc1_bu1_security_group_2_ingress_tcp_443" {
            - description    = "Policy from Security_Group_1 to Security_Group_2 on
  tcp_443"
            - type           = "ingress"
            - from_port      = 443
            - to_port        = 443
            - protocol       = "tcp"
            - cidr_blocks    = ["10.0.0.0/12","10.32.0.0/12"]
            - security_group_id = "${aws_security_group.dc1_bu1_security_group_2.id}"
            - }
          "
        },              1058
        {
          "Type": "Service Added"
          "Path": "dc1.bu1.Security_Group_2.service14"
          "AddedResource": "service14"
          "Severity": "Medium"     1060
                                                                 1062
          "Corresponding output changes": "
            + resource "aws_security_group_rule"
  "dc1_bu1_security_group_2_ingress_tcp_8000" {
            + description    = "Policy from Security_Group_1 to Security_Group_2 on
  tcp_8000"
            + type           = "ingress"
            + from_port      = 8000
            + to_port        = 8000
            + protocol       = "tcp"
            + cidr_blocks    = ["10.0.0.0/12","10.32.0.0/12"]
            + security_group_id = "${aws_security_group.dc1_bu1_security_group_2.id}"
            + }
          "
        },
```

```
"Type": "Policy Added"
"Path": "dc1.bu1.Security_Group_3"
"AddedResource": "policy"
"Severity": "Medium"
```
1066

"Corresponding output changes": "
    resource "aws_security_group_rule"
"dc1_bu1_security_group_3_ingress_tcp8443" {
        description    = "Policy from Security_Group_1 to Security_Group_3 on tcp_8443"
        type      = "ingress"
        from_port  = 8443
        to_port    = 8443
        protocol   = "tcp"
        + cidr_blocks   = ["10.0.0.0/12", "10.16.0.0/12"]
        security_group_id = "${aws_security_group.dc1_bu1_security_group_3.id}"
    }

1068 resource "aws_security_group_rule"
"dc1_bu1_security_group_3_ingress_tcp9443" {
        description    = "Policy from Security_Group_1 to Security_Group_3 on tcp_9443"
        type      = "ingress"
        from_port  = 9443
        to_port    = 9443
        protocol   = "tcp"
        + cidr_blocks   = ["10.0.0.0/12", "10.16.0.0/12"]
        security_group_id = "${aws_security_group.dc1_bu1_security_group_3.id}"
    }
"
  }
 ]
}
}
]
}

Security policy deployment dashboard 1350 search for pipelines...  [Search]

| Pipeline | Change case | Deployment status | Start time | End time |
|---|---|---|---|---|
| datacenter1 | Deploy20201231axa | Successful | 2020/12/31 11:00 AM | 2020/12/31 11:15 AM |
| bu1 | Deploy20201231axa | Successful | 2020/12/31 11:00 AM | 2020/12/31 11:15 AM |
| bu2 | Deploy20201231axa | Unsuccessful | 2020/12/31 11:00 AM | 2020/12/31 11:15 AM |
|  |  |  |  |  |
|  |  |  |  |  |
|  |  |  |  |  |
| datacenter n | Deploy20201230b9n | Successful | 2020/12/30 2:00 PM | 2020/12/30 2:10PM |

Columns: 1352 Pipeline, 1354 Change case, 1356 Deployment status, 1358 Start time, 1360 End time

Figure 13B

AUTOMATION OF CLOUD NETWORK SECURITY POLICY ANALYSIS AND DEPLOYMENT

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes

COPYRIGHT NOTICE

A portion of the disclosure of this patent document contains material, which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This patent document generally relates to network security. More specifically, this patent document discloses techniques for network security orchestration and management across different clouds.

BACKGROUND

Enterprises are moving their infrastructures to public clouds for reasons including: fast bootstrapping processes, reliability, geographical availability, scalability and cost factor. Some estimate that over 90% of enterprises use clouds, and over 80% of enterprises have a multi-cloud strategy, in which an enterprise builds infrastructures on multiple cloud platforms. Reasons for a multi-cloud strategy include mitigating single cloud provider locking risks, privacy and governance compliance in different regions (e.g., an enterprise having to use a Chinese cloud provider if it wants to operate in China). Additional benefits of a multi-cloud strategy include greater agility and flexibility, and fulfillment of customer requests (e.g., customers might not want to host their data on a competitor's platform).

In the past number of years, we have witnessed many severe data breaches related to public cloud infrastructures. This problem is compounded in a multi-cloud strategy because the attack surface is bigger, and the chance for misconfiguration errors in multiple clouds is greater.

BRIEF DESCRIPTION OF THE DRAWINGS

The included drawings are for illustrative purposes and serve only to provide examples of possible structures and operations for the disclosed systems, apparatus, methods and computer program products. These drawings in no way limit any changes in form and detail that may be made by one skilled in the art without departing from the spirit and scope of the disclosed implementations.

FIG. 3A shows an example of a policy input 300A in JSON format, in accordance with some implementations.

FIG. 3B shows an example of a policy input 300B in YAML format, in accordance with some implementations.

FIG. 4A shows an example of an internal representation 400, in accordance with some implementations.

FIG. 5A shows an example of a cloud-specific policy set 500A for an AWS cloud, in accordance with some implementations.

FIG. 5B shows an example of a cloud-specific policy set 500B for a GCP cloud, in accordance with some implementations.

FIG. 10A shows an example of changes to a policy input in JSON format, in accordance with some implementations.

FIG. 10B shows an example of a system report that identifies changes to a security policy in JSON format, in accordance with some implementations.

FIG. 13B shows an example of a user interface 1350 that can indicate a deployment status of different security policies in accordance with some implementations.

DETAILED DESCRIPTION

Figure 1:
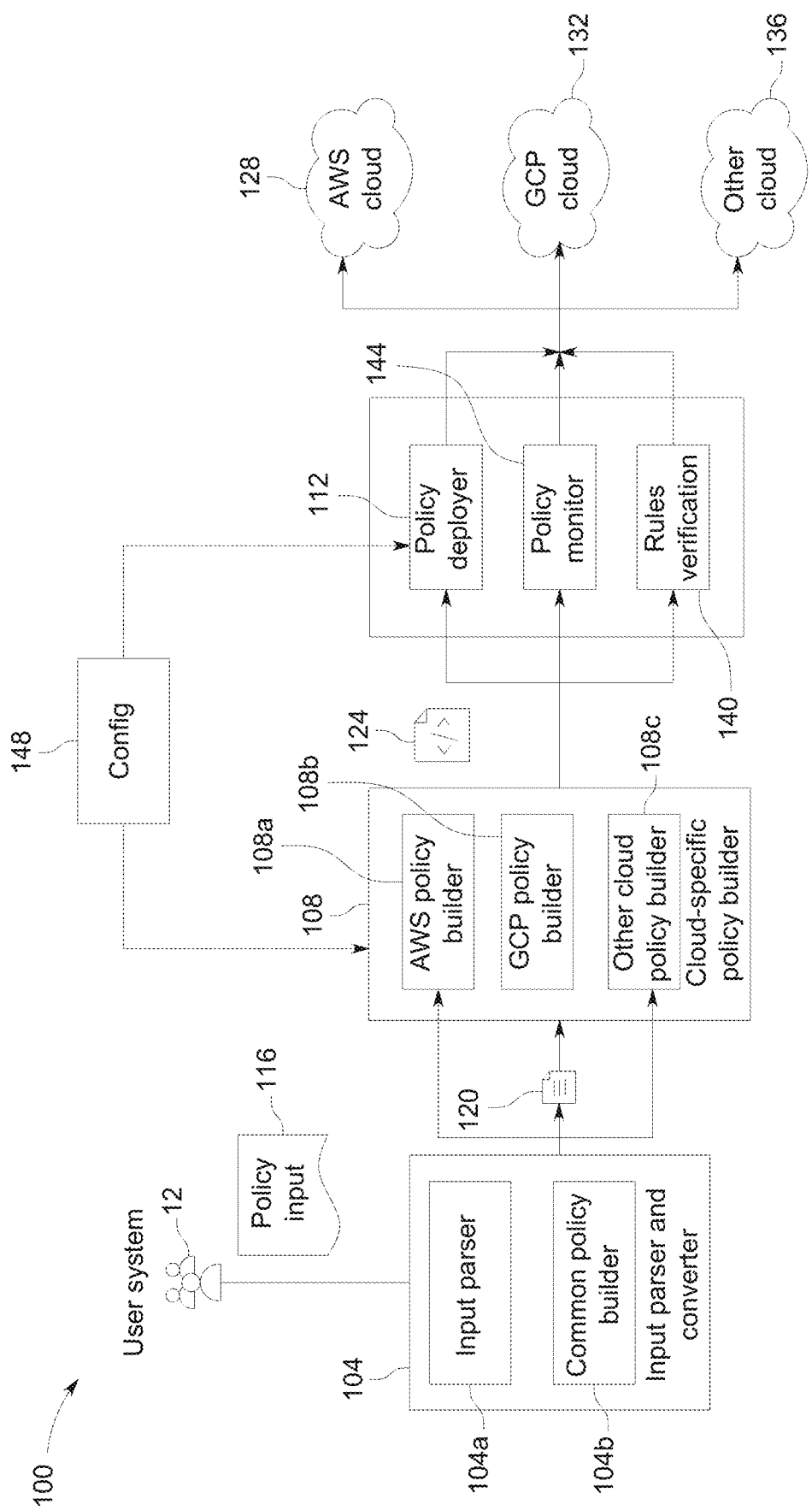
FIG. 1 shows a block diagram of an example of a network security system 100 providing a framework for network security orchestration and management, in accordance with some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used, and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Some implementations of the disclosed systems, apparatus, methods and computer-readable media provide network security orchestration and management across different cloud providers to facilitate transitioning of enterprise infrastructure to public clouds. For instance, a multi-cloud infrastructure can be implemented on popular public cloud platforms including Amazon Web Services (AWS), Google Cloud Platform (GCP), Microsoft Azure and Alibaba Cloud. Customer data can be protected in the various public clouds of the multi-cloud infrastructure. Some implementations of disclosed network security techniques and frameworks provide fundamental security measures to protect customer data from unauthorized access. For instance, some security measures require that only entities (internal or external with respect to a network) with proper permissions and authorizations can access certain resources in the network.

In some implementations, a network security solution is provided in a multi-cloud infrastructure, even though each cloud provider provides different types of security primitives and protections. Some of the disclosed examples of network security solutions are cloud-independent; that is, the same version of a network security solution can be deployed on multiple clouds multiple times, even though the particular deployed solution on a given cloud uses that cloud's particular tools and supports. So, the same security posture is realized across the various clouds using cloud-specific security controls tailored to each cloud. Networks, infrastructures and data centers can be quickly scaled and expanded while maintaining the same security posture.

Some implementations of the disclosed network security solutions are transparent to users including application developers, service developers and engineers who write and deploy applications and services on a network. Such users do not need to know cloud-specific security controls to implement network security for their services. Some implementations of the disclosed frameworks and techniques offer a general, cloud-independent tool to users for that purpose.

Some implementations provide centralized orchestration, management, security policy versioning and security monitoring. For instance, a network security overview of data centers of interest can be generated even when those data centers are deployed on different clouds and regions. Using the disclosed techniques, network security policies can be added, removed and modified. These policies can be deployed to all or selective instances of data centers.

Once implemented, some of the disclosed network security frameworks and techniques can improve engineering productivity and reduce time delay when an enterprise is expanding to a new data center or region or adding a new cloud platform to a multi-cloud infrastructure. Engineers may not need to worry about learning a new cloud's security controls or have to deal with security orchestration for their services. Hence, engineers can focus on improving their services or building new products to boost productivity. Also, the time to bootstrap and deploy a new data center can be shorter than with conventional data center builds (e.g., a matter of days versus years).

Some of the disclosed network security frameworks and techniques can be implemented to realize a number of use cases including: bootstrapping a new data center on a cloud; adding, deleting, and modifying existing data center information such as a network layout or a policy; adding, deleting, and modifying a security group in a functional domain; adding, deleting, and modifying a service in a security group in a functional domain; and adding, deleting, and modifying a policy in a security group in a functional domain.

Additionally, systems and methods for correlating security policy input and output changes are disclosed. In some implementations, differences between two versions of a security policy input can be identified. For example, a first version can be an original user-submitted version, and a second version can be a modified version of the first version with one or more changes to the security policy input. Continuing with this example, in some implementations corresponding versions of cloud-specific security policy outputs can be retrieved, and differences between the versions can be identified. In some implementations, differences between the versions of the security policy inputs can be correlated to differences between the versions of the security policy outputs. For example, a difference in a security policy input to remove a particular service can be matched to a corresponding difference in the security policy output.

In some implementations, after differences in versions of security policy inputs have been matched to differences in versions of security policy outputs, a record or report can be generated that indicates the matched differences. In some implementations, the report or record can be formatted in a manner that is easily readable, thereby allowing a network or security administrator to quickly identify differences in cloud-specific security policy outputs that are a consequence of submitted changes in security policy inputs.

Moreover, in some implementations, severity characteristics of each identified difference can be identified or retrieved from a table and included in the record or report. For example, removal of a service can be indicated as having a high severity or a high impact, whereas addition of a service can be indicated as having a low or medium severity. By presenting identified differences in connection with an associated severity of the difference, the systems and methods described herein can allow a network or security administrator to quickly identify high severity changes for additional manual analysis.

By allowing cloud-specific security policy output changes to be identified in an easy to read format, manual time spent reviewing policy changes can be reduced. Moreover, by redirecting manual time spent reviewing policy changes to those deemed to be of high severity, manual time can be used more efficiently. More efficient use of manual time may improve overall network security and cloud security by reducing human errors while also allowing a larger number of policy changes to be implemented quickly.

Additionally, systems, apparatus, methods and computer-readable media for automation of network security policy changes analysis and deployment are provided. In some implementations, differences between two versions of a cloud-specific security policy output (i.e., a version that was previously deployed and a new version that is to be deployed) can be identified. In some implementations, differences can be assigned severity levels or characteristics that indicate a severity impact of the difference. For example, a new version of a security policy output that removes a service, allows new or additional Internet traffic, etc. can be assigned a high severity level or characteristic. As another example, a new version of a security policy output that adds a service can be assigned a low or medium severity level or characteristic. In some implementations, a determination of whether to automatically deploy the new version of the security policy output can be made based on the assigned severity level(s) or characteristic(s). For example, in some implementations, a new version of a security policy output that contains only low severity or medium severity differences relative to a previously deployed version can be automatically deployed without manual review. Conversely, in some implementations, a new version of a security policy output that contains high severity differences relative to a previously deployed version can be flagged or routed for manual review.

In some implementations, assignment of severity levels or characteristics to a new version of a security policy output can allow the new version of the security policy output to be analyzed using semantic intelligence that can provide a more accurate or meaningful analysis of differences. For example, in some implementations, severity levels or characteristics can be assigned based on types of changes identified between two versions of policy output, thereby allowing differences between the two versions to be meaningfully categorized in a context of impact.

In some implementations, one or more reports can be generated and/or presented, where each report indicates information about security policy outputs to be deployed. For example, in some implementations, a report may indicate one or more versions of security policy outputs that have been flagged for manual review. In some such implementations, such a report can indicate identified differences between the new version of the security policy output and a previously deployed version, severity level(s) or character-istic(s) of the identified difference(s), etc. As another example, in some implementations, a report may indicate a deployment status of security policy outputs that have been approved for deployment.

By selecting security policy outputs for automated deployment (i.e., deployment without manual review) based on a determined severity level of the changes in the security policy, manual resources can be conserved and optimized. For example, by prioritizing manual review for high severity security policy changes, manual workload can be reduced, thereby conserving resources, as well as reducing a chance of error introduced during manual review. Moreover, by automating deployment of security policies determined to be of relatively low severity, security policies that include relatively minor changes relative to previously deployed versions can be quickly deployed, without waiting for manual review. This can provide improved cloud and network security by allowing security policies to be more quickly updated.

In some implementations, the techniques, operations, and systems described herein for automation of cloud network security policy analysis and deployment may be used for canary deployment or test development. For example, in some instances, system inputs can indicate that a new version of a cloud-specific security policy is to be deployed to a limited number of cloud services. Continuing with this example, the system inputs can further indicate that the new version is to be more extensively deployed in response to determining that no errors have been triggered during the initial deployment to the limited number of cloud services. In some implementations, a list of canary services can be stored in a configuration file. In some such implementations, the configuration file can be retrieved and read by a system for automated analysis and deployment of network policies at runtime. In some implementations, a list of canary services can be varied, for example, depending on a type of deployment environment (e.g., test, staging, production, etc.).

FIG. 1 shows a block diagram of an example of a network security system 100 providing a framework for network security orchestration and management, in accordance with some implementations. In the example of FIG. 1, system 100 has components including an input parser and converter 104, a cloud-specific policy builder 108 and a policy deployer 112. Input parser and converter 104 is configured to obtain a policy input 116. In this example, a user system 12 sends policy input 116 to input parser and converter 104. Policy input 116 can also or alternatively be retrieved by input parser and converter 104 from other computing resources such as servers, computing devices, memory devices, databases, other data repositories, etc.

In FIG. 1, policy input 116 is network security information including any number of security policies, which can form a set indicating permitted communications between or among computing resources. Policy input 116 can be in the form of a network design or layout and can be in various formats such as JSON or YAML, which can be used to declare network design attributes as further described and illustrated herein. Policy input 116 can include one or more of: subnet data, Internet Protocol (IP) address allocation data, service data, workload data, security group data, security zone data or access policy data, by way of example. For instance, policy input 116 can include data of a network design such as how many subnets, how many services, how many security groups, how many security zones, a characterization of the access policy within a zone and between/among services, etc.

In some implementations, the terms "security group" and "security zone" as used herein are interchangeable, for instance, when a security group refers to a zone where multiple online services or other computing resources like a server can be grouped together, and the grouped resources have the same security exposure to the outside, i.e., external to the zone. As further explained herein, for instance, it can be specified that a security group has specific ports which are open, like a listening port, and other ports which are blocked.

In FIG. 1, a policy set defined by policy input 116 can dictate allowed communications within a network or within a security zone and between or among computing resources within the network/security zone and outside entities. Outside entities refers to entities external to the network/security zone such as computing devices or systems of Internet users, customers of an enterprise, entities of a data center at a particular location, etc.

In some implementations, as shown in FIG. 1, input parser and converter 104 can be configured to include two subcomponents: input parser 104a and common policy builder 104b. In this example, input parser 104a receives and reads policy input 116 in any of a number of available formats. After reading policy input 116, input parser 104a passes policy input 116 to common policy builder 104b, which is configured to convert policy input 116 to an internal representation 120 of policy input 116. In this example, internal representation 120 is a cloud-independent representation of policy input 116, that is, independent of any of the various available public cloud platforms such as AWS, GCP, Microsoft Azure, and Alibaba Cloud. Internal representation 120 is how a policy input is represented in system 100. Common policy builder 104b generates internal representation 120 as an output for further processing. As further explained herein, examples of internal representation 120 can specify one or more functional domains for an instance of a data center. Each functional domain can include one or more of: security groups of computing services, one or more subnets, one or more ingress rules, one or more egress rules, etc.

In FIG. 1, cloud-specific policy builder 108 is in communication with common policy builder 104b and takes internal representation 120. Policy builder 108 generates cloud-specific policy sets 124 from internal representation 120, and each cloud-specific policy set can be applied to a specific cloud platform such as AWS, GCP or Microsoft Azure. In this example, policy builder 108 includes sub-components in the form of AWS policy builder 108a, GCP policy builder 108b, and other cloud policy builder 108c. Each policy builder 108a, 108b or 108c uses cloud-specific tools, techniques, and native controls to convert internal representation 120 to a cloud-specific policy set as an output. For example, AWS policy builder 108a is configured to use security groups and security group rules to restrict access to computing resources. But GCP policy builder 108b is configured to use a firewall to restrict access to computing resources. The way each cloud provider (AWS, GCP, etc.) enforces policies is different from cloud-to-cloud. As further explained herein, a cloud-specific policy set can specify one or more of: an instance of a data center, computing resources, security groups of computing services, one or more subnets, one or more ingress rules, or one or more egress rules.

In FIG. 1, policy deployer 112 is in communication with policy builder 108 to receive cloud-specific policy sets. Policy deployer 112 is responsible for sending a cloud-specific policy set to the relevant cloud, such as deployment of an AWS-specific policy set to AWS cloud 128, a GCP-specific policy set to GCP cloud 132, and other cloud-specific policy set to other cloud 136. Policy deployer 112 can be implemented to have a cloud-specific configuration tool and a deployment pipeline to each cloud 128, 132 or 136.

In some implementations, policy deployer 112 uses Terraform by HashiCorp to deploy a cloud-specific policy set in the Terraform format to the relevant cloud. Terraform is one of a number of available tools or services that could be used by policy deployer 112 to deploy cloud-specific policy sets in a public cloud such as cloud 128, 132 or 136, so it should be appreciated that in some other implementations a different tool for state management and/or policy deployment is used by policy deployer 112 as an alternative or in addition to Terraform. For instance, a cloud-specific policy set could indicate a desired network structure including how many computing resources and/or how many containers are desired to be opened. Terraform can use the appropriate cloud application programming interface (API), like the AWS API, to create resources, containers, etc. Policy deployer 112 can take a generated cloud-specific policy set, call Terraform to run on a specific cloud, and then get a result back from the cloud directly or via Terraform.

In some implementations, a configuration (config) file can be sent to or retrieved by one or more components of system 100 to configure system 100. In some other implementations, the config file is omitted. In the example of FIG. 1, a config file 148 can be read by policy builder 108 and policy deployer 112 at runtime for system 100. Config file 148 has configuration properties including identifications of the particular clouds (128, 132 and 136 in this example) as the clouds for which policies will be built and the clouds to which policies will be deployed. In some instances, config file 148 can specify details such as network addresses and credentials for communicating with a cloud 128, 132 or 136.

In some implementations, a rules verification component 140 in FIG. 1 is implemented as a tool to verify that deployed policies on a particular cloud 128, 132 or 136 match with policies of a cloud-specific policy set. For instance, rules verification component 140 can determine, directly or via Terraform, that policies ultimately deployed on AWS cloud 128 match the AWS-specific policy set.

In FIG. 1, another component in the form of a policy monitor 144 in communication with clouds 128, 132 and 136 is configured to monitor deployment of a cloud-specific policy set to the relevant cloud. For instance, monitoring can include one or more of: obtaining deployment status information including success or an error in the deployment, obtaining resource status information indicating status of one or more computing resources in a cloud, detecting any drift or other change between the cloud-specific policy set and the actual policy set deployed on a cloud, generating a notification message indicating the change, or sending to the cloud a request message that any change be reverted. For instance, policy monitor 144 can make sure that the policies of a cloud-specific policy set were deployed to the specific cloud. If deployment is in progress or has completed, policy monitor 144 can determine such status and verify that specified resources are created and are up and running. By the same token, policy monitor 144 can determine if there was a failure in deployment and what went wrong. If some entity modified, added to, or deleted a deployed policy, policy monitor 144 can reverse or request reversal of such changes.

In some implementations, an account is registered with each cloud 128, 132 or 136, and particular cloud-specific APIs are used by policy monitor 144 to retrieve the desired information for monitoring. Policy monitor 144 can request status of every resource that was created for the account, and Terraform can be used to read the status information using the appropriate APIs registered for the account. Status of accounts on the different public clouds can be read by policy monitor 144, and any modifications can be detected by policy monitor 144.

Figure 2:
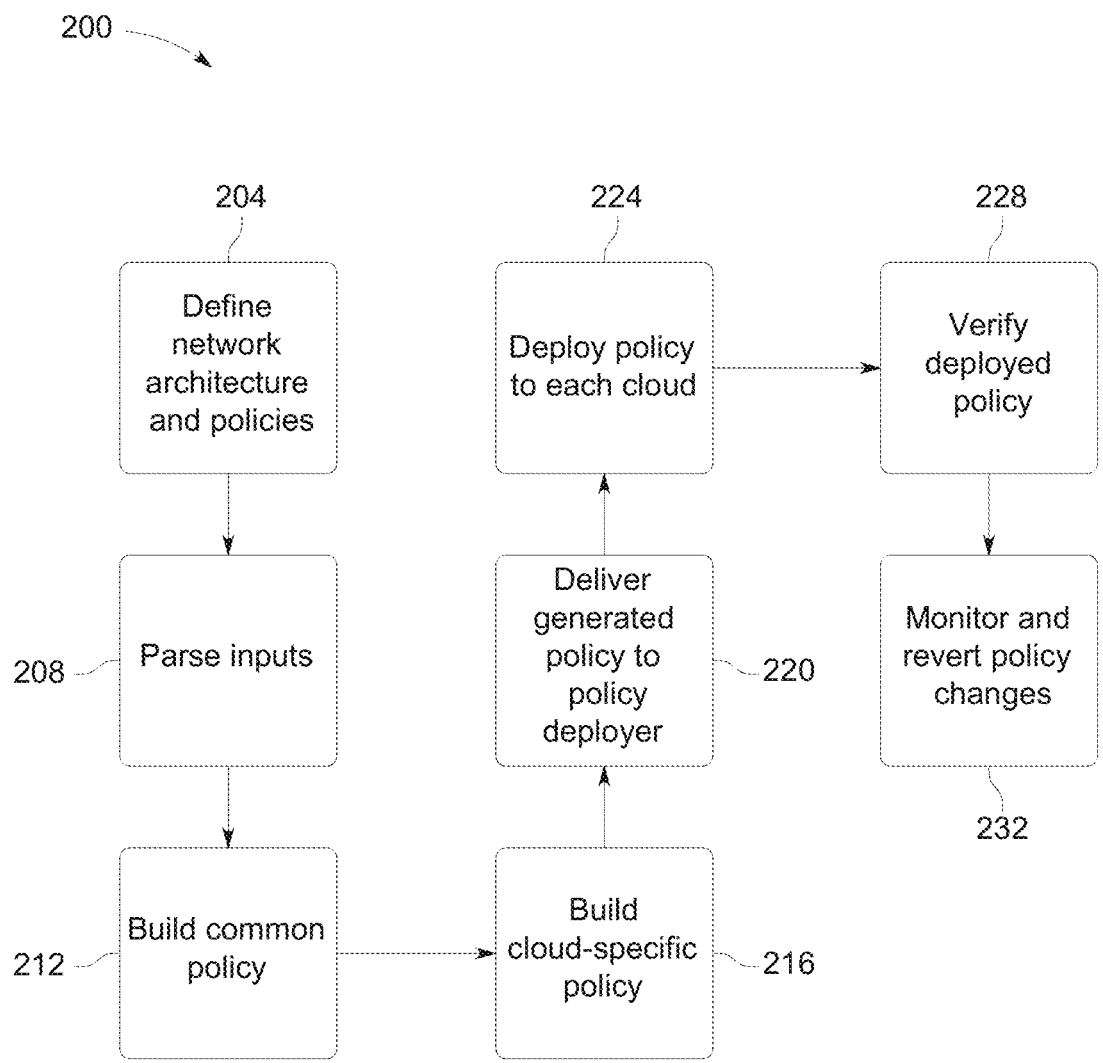
FIG. 2 shows a flowchart of an example of a method 200 for network security orchestration and management, in accordance with some implementations.

FIG. 2 shows a flowchart of an example of a method 200 for network security orchestration and management, in accordance with some implementations. At 204 of FIG. 2, a network architecture and associated security policies are defined. These policies can form a set indicating permitted communications between or among computing resources, as described herein. In some instances, the definition of policies at 204 can be initiated by a user system 12. For instance, user system 12 can be operated by a user, who is a service owner writing an online service for a data center. In another example, user system 12 can be a data center instance owner who desires to instantiate a new data center on a public cloud. Portions of the network architecture and security policies of 204 can also or alternatively be defined automatically by a server. In some implementations, the network architecture and policies of 204 are retrieved from a database or other memory device.

In FIG. 2, at 208, input parser 104*a* of FIG. 1 receives the information defined at 204 as a policy input 116 and parses policy input 116, as further explained herein. The parsed policy input 116 can then be relayed to common policy builder 104*b*, which is configured to build a common policy in the form of internal representation 120 at 212 of FIG. 2. At 216 of FIG. 2, cloud-specific policy builder 108 is configured to build cloud-specific policy sets 124 from internal representation 120 delivered by common policy builder 104*b*, as further explained herein. At 220, cloud-specific policy builder 108 delivers the generated cloud-specific policy sets 124 to policy deployer 112 of FIG. 1. Thus, at 224 of FIG. 2, policy deployer 112 can deploy each cloud-specific policy set to the applicable cloud, as further explained herein. At 228 of FIG. 2, rules verification component 140 of FIG. 1 can verify that the policies actually deployed on a particular cloud match the policies of the corresponding cloud-specific policy set delivered to policy deployer 112. At 232 of FIG. 2, policy monitor 144 communicates with clouds 128, 132 and 136 to monitor deployment of the cloud-specific policy sets.

FIG. 3A shows an example of a policy input 300A in JSON format, in accordance with some implementations, and FIG. 3B shows an example of a policy input 300B in YAML format, in accordance with some implementations. Policy inputs 300A and 300B provide two examples of many different policy inputs capable of being processed by input parser and converter 104 of FIG. 1. In the examples of FIGS. 3A and 3B, an infrastructure is declared for a particular instance of a data center. In FIG. 3A, at 304, security groups for the instance of the "datacenter1" data center are declared. In this example, security groups 304 include a first group 308 named "Logging_Monitoring," a second group 312 named "Processing," and a third group 316 named "Gateway." In other examples of policy inputs, additional security groups with other names can be included in the declared security groups.

At 320 of FIG. 3A, security policies are declared for the "Logging_Monitoring" group 308. There can be zero policies, one policy, or any number of policies declared for a particular security group. In the example of FIG. 3A, each policy has at least two fields: a destination, and a source. The destination as well as the source of a policy can specify services as well as security groups. Thus, specific services and/or security groups can be identified and user-customized. There can be one or many services and/or groups set for the particular policy. In this example, a first policy is characterized by destination 324 and source 328. A second policy is characterized by destination 332 and source 336. A service and a group are named for destination 324, while "all" services are identified for source 328. Thus, in this example, there are no restrictions on which services can transmit data as a source for the first policy. In this example, a different set of services is specified for destination 332, as is the case with the services listed for source 336.

In the example of FIG. 3A, a "public" field 340 has a value of false, indicating that security group 308 is a private group as opposed to a public group. In other words, services in the security group are not exposed on the Internet or another data network. Thus, a port can be opened for services in this security group to accept incoming traffic from other internal services, that is, services within the instance of the data center in this example. At 342, an IP subnet range is defined for security group 308. This IP subnet range specifies that all services in the particular security group will get an IP address from the designated range of 10.0.0.0/12. At 344, a functionality of security group 308 is described, indicating in this example that the security group's function is logging and monitoring other services. A list of names of services in the security group is set forth at 348. Thus, when a policy is looked up during processing, the list of service names at 348 can be referenced. In this example, each service name in the list is unique, so a service can only belong to one security group.

In the example of FIG. 3B, a security group named "DC.Test.Logging_Monitoring" is identified at 350. Services in the group can draw an IP address from an IP subnet range identified at 352. For instance, when a service in security group 350 is deployed on a server, that server has to have an IP address in the designated subnet range at 352. A list of service names belonging to security group 350 is identified at 354, and a public or private designation as explained above is declared at 356.

In the example of FIG. 3B, at least two policies are declared for the security group: a first policy described at 358, and a second policy described at 360. Each policy has a source and a destination specified, as well as services specified. For instance, a source 362, a destination 364 and a list of services 366 are specified for the policy described at 358. In this example, a different security group, "DC.Test.Logging_Monitoring," is named for source 362, and "DC.Test.Processing" is named for destination 364. A list of services is named at 366 for policy 358. Each service named in list 366 is able to listen at a specific port or range of ports and accepts a specified protocol. For instance, the service named tcp443/service1 368 listens at a port 443, indicated at 370, and accepts only TCP traffic, as indicated at 372. Thus, each service in list 366 is characterized in terms of open ports and open protocols. The policy declared at 360 follows a similar format as the policy declared at 358.

In the example of FIG. 4A, input parser and converter 104 of FIG. 1 is configured to set up one or more functional domains of one or more data center instances: in this example, functional domain "fd1" at 404 of FIG. 4A and functional domain "fd2" at 408 of data center instance "datacenter1." In this example, a functional domain refers to a unique infrastructure of services and security groups that are categorized under an identifiable function. The function can be independent of other functions and related to any of a variety of enterprise purposes. For instance, a functional domain can be for the purpose of sales, marketing or human resources (HR). For each functional domain, a set of security groups is identified. In this example, the "Processing" security group 412 and the "Logging_Monitoring" security group 416 are identified in functional domain A. There may be one or many functional domains declared within a data center instance, referred to in this example as a DC Instance 420.

In FIG. 4A, internal representation 400 is in a tree-based data structure. There is a root 424, and each data center instance (DC Instance) 420 is structured as a branch of root 424. Under each data center instance 420, each functional domain 404, 408, etc. is a branch of 420. Within each functional domain branch, there are sub-branches including: name, security group, subnet, services, ingress rules and egress rules. In the example of the "Processing" security group 412, ingress rules 428 and egress rules 432 have been built by input parser and converter 104 of FIG. 1. Ingress rules 428 are defined to filter the source of traffic, while egress rules 432 are configured to filter the destination of traffic. In this example, under the ingress rules 428 branch are sub-branches of rule names such as rule name 436 and leaves within the rule name of a port 440, protocol 444 and source 448. In this example, port 440 specifies that port 443 will be open to listen for incoming traffic, protocol 444 specifies that only TCP and UDP types of traffic will be accepted, while source 448 specifies that only traffic from the identified IP subnet ranges can talk to services identified at 452. The identified services 452 listen on the specified port 440. In this way, incoming traffic is filtered in this example.

In some implementations, egress rules 432 are generally configured in similar fashion as ingress rules 428. In this example, a special rule, "allow_all" 436 specifies that all services in security group 412 can talk with any entity outside or inside of a network on any port (1-65355) with the two protocols of TCP and UDP using the specified IP subnet address ranges for a destination, in this example, 10.0.0.0/12 and 8.8.8.8/32.

In FIG. 4A, egress rules 432 provide for destinations associated with outgoing traffic rather than sources associated with incoming traffic. Thus, in this example, communication with security group "Logging_Monitoring" is permitted because that security group is in the subnet range of 10.0.0.0/12. In some other examples, particular IP addresses are specified in addition to or as an alternative to the ranges in FIG. 4A.

Figure 4B:
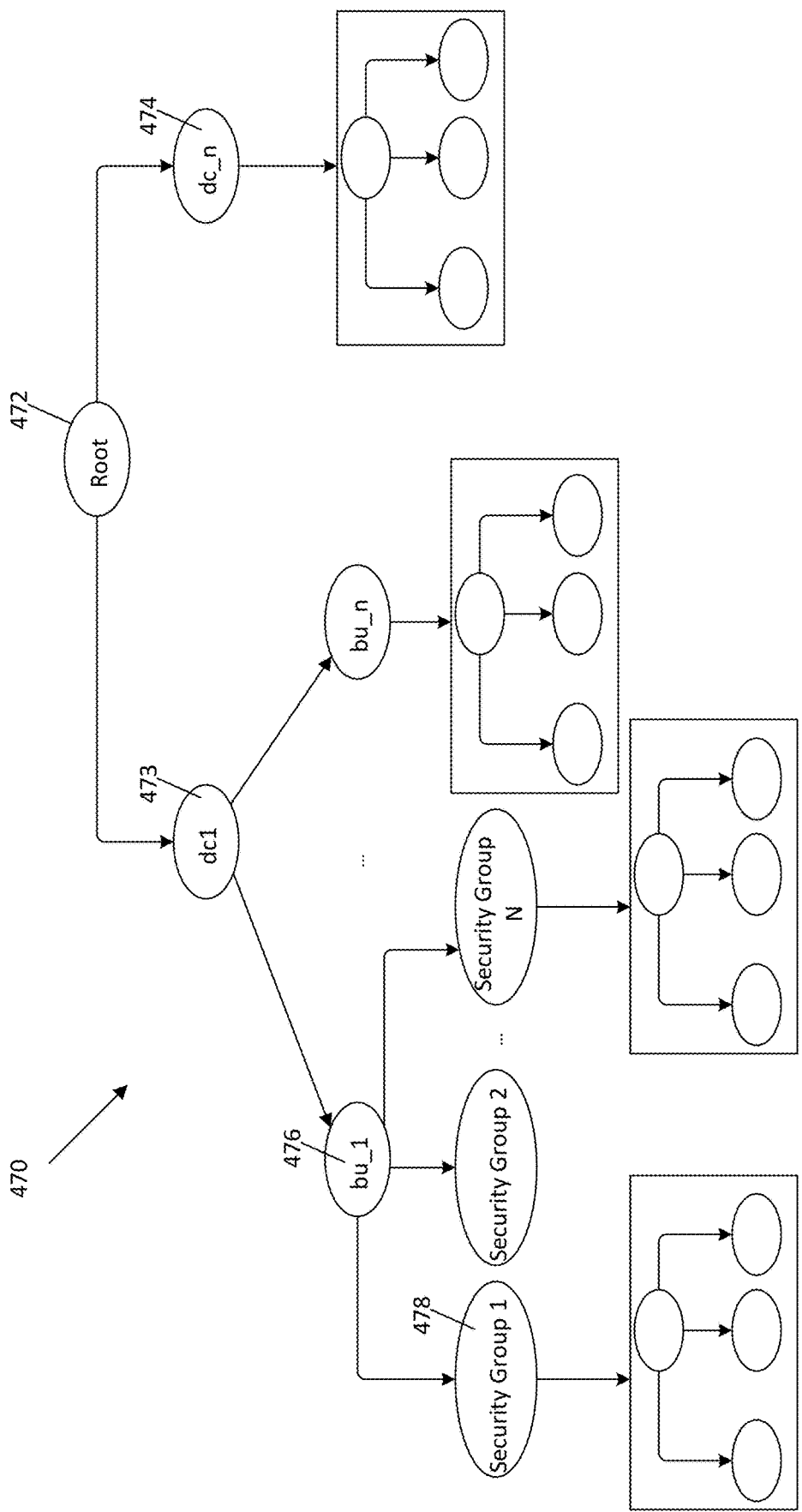
FIGS. 4B and 4C show examples of an internal representation arranged in a tree format, in accordance with some implementations.
Figure 4C:
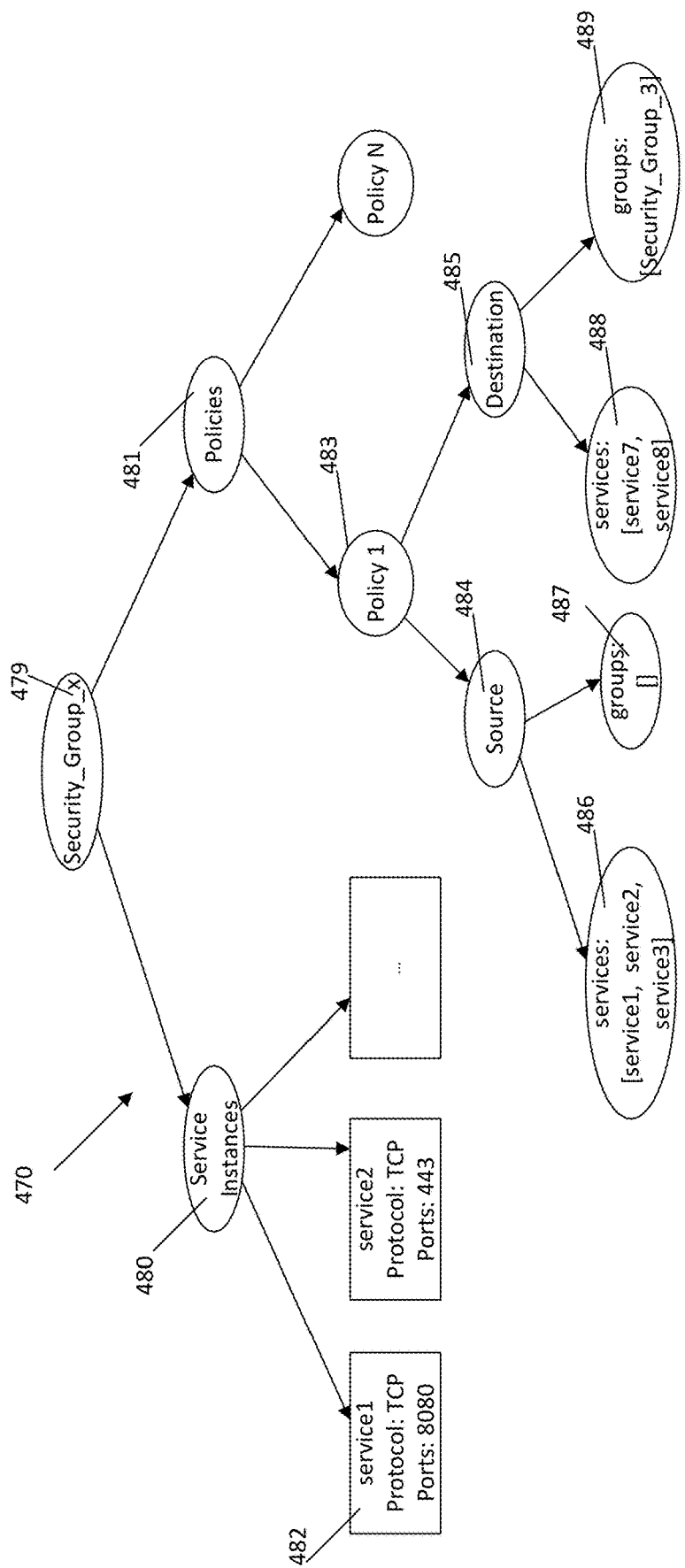

FIGS. 4B and 4C show example schematic diagrams of a tree-based data structure 470 of an internal representation in accordance with some implementations of the disclosed subject matter. Note that the hierarchy and example nodes and branches shown in FIGS. 4B and 4C are merely exemplary. In some implementations, a tree-based data structure may have different nodes and branches than what is shown in FIGS. 4B and 4C.

As illustrated, tree-based data structure 470 includes a root node 472. Root node 474 includes various branches, each corresponding to a different data center instance, such as data center instances 473 and 474 as shown in FIG. 4B. Under each data center instance are various functional domain branches. For example, data center instance 473 includes branches corresponding to a functional domain branch 476, corresponding to "bu_1." Continuing, each functional domain branch includes various security groups. For example, functional domain 476 includes a security group branch 478, indicated as "Security Group 1."

FIG. 4C shows branches of tree-based data structure 470 off of a security group branch. As illustrated, a security group branch 479 has branches 480 and 481, corresponding to "Service Instances" and "Policies," respectively.

Each service instance branch, such as branch 480, can have various branches, each corresponding to a different service instance. For example, branch 480 has a branch 482, corresponding to "Service 1." Each service instance branch can indicate a protocol type and/or one or more port numbers, as illustrated in FIG. 4C. As illustrated, there can be various branches from branch 481, which corresponds to "Policies." Each branch from branch 481, such as branch 483, can correspond to a different policy instance. A branch corresponding to a policy instance, such as branch 483, can have two branches (e.g., branches 484 and 485), which correspond to a source and a destination, respectively. Source branch 484 can have two branches (e.g., source services branch 486 and source groups 487). Source services branch 486 can indicate a list of allowed services associated with source branch 484. Source groups branch 487 can indicate a list of allowed groups associated with source branch 484. Similarly, destination branch 484 can have two branches (e.g., destination services branch 488 and destination groups 489). Destination services branch 488 can indicate a list of allowed services associated with destination branch 485. Destination groups branch 489 can indicate a list of allowed groups associated with destination branch 485.

FIG. 5A shows an example of a cloud-specific policy set 500A for an AWS cloud, in accordance with some implementations. In the example of FIG. 5A, policy set 500A provides one example of a policy output in Terraform format for an AWS cloud infrastructure. As further explained herein, Terraform is one tool providing a format for infrastructure programming of specific public clouds, as desired for some implementations. In policy set 500A, it is specified at 504 that a resource on AWS of the security group type is being created. At 508, the particular functional domain of a particular data center instance is identified. A name 512 matches the internal representation, in this example. At 516, tags are used to specify that any service belonging to the Processing security group will be attached. A first policy to be enforced is declared at 520. An ingress rule for the policy 520 is declared at 524. In this example, the ingress rule specifies that incoming traffic is allowed on port 443 if the protocol is TCP and traffic is from the IP subnet range 10.0.0.0/12. Rule names can be attached at 528, for instance, so Terraform will return a security group ID with the rule name when Terraform runs a program on the AWS cloud.

FIG. 5B shows an example of a cloud-specific policy set 500B for a GCP cloud, in Terraform format, in accordance with some implementations. In the example of FIG. 5B, a resource of the firewall type is declared at 534 using an appropriate GCP definition. The name of a policy to be enforced is identified at 538. In this example, ingress rules for the policy are declared at 542. In this example, a first ingress rule specifies that certain incoming communications are allowed at 546 when the communications satisfy the requirement of the TCP protocol as well as the requirement of coming in from designated ports and ranges at 550. Additional ingress rules 554 and 558 are declared with appropriate protocol and port requirements.

Figure 5C:
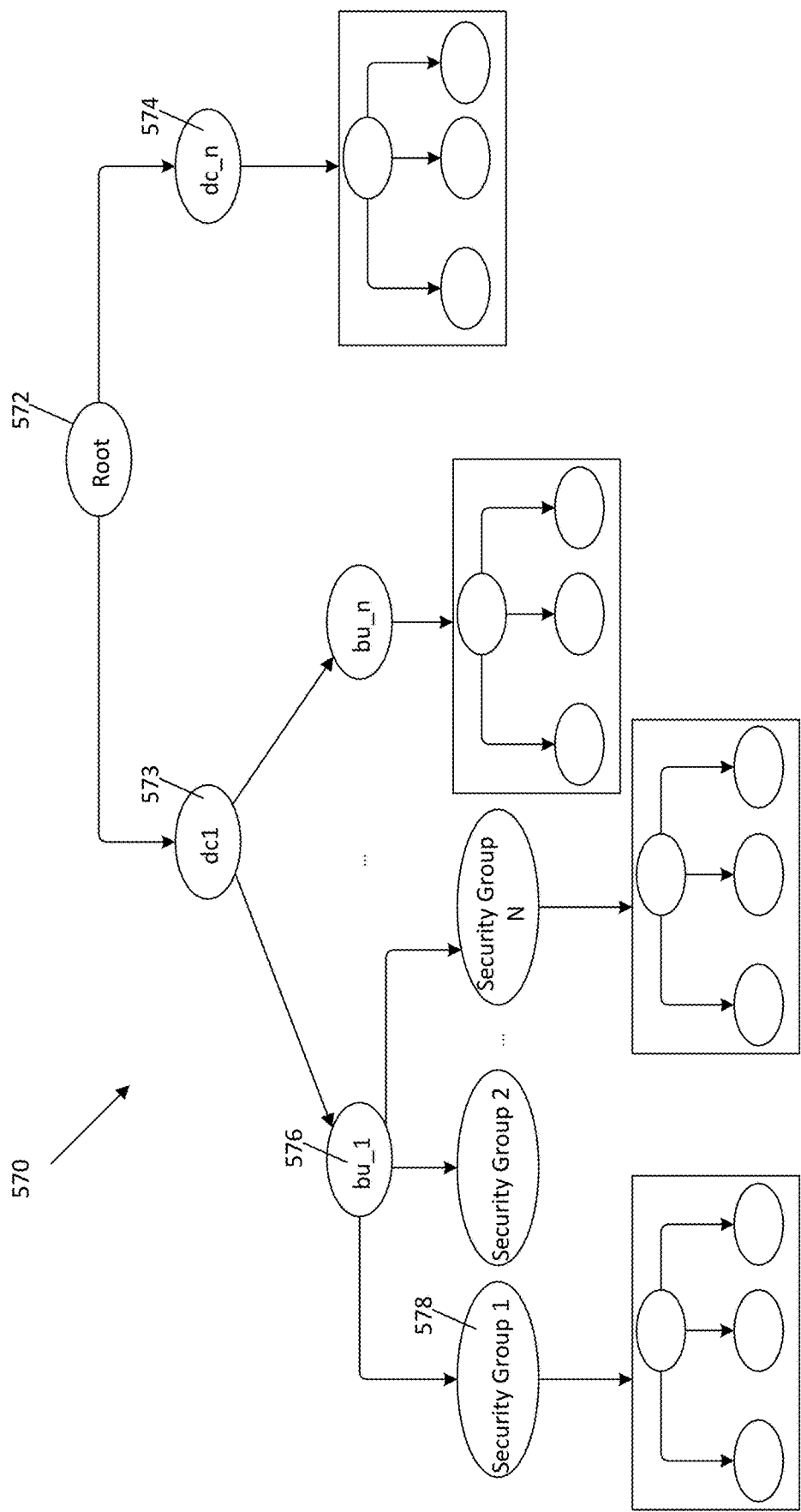
FIGS. 5C and 5D show examples of a cloud-specific policy arranged in a tree format, in accordance with some implementations.
Figure 5D:
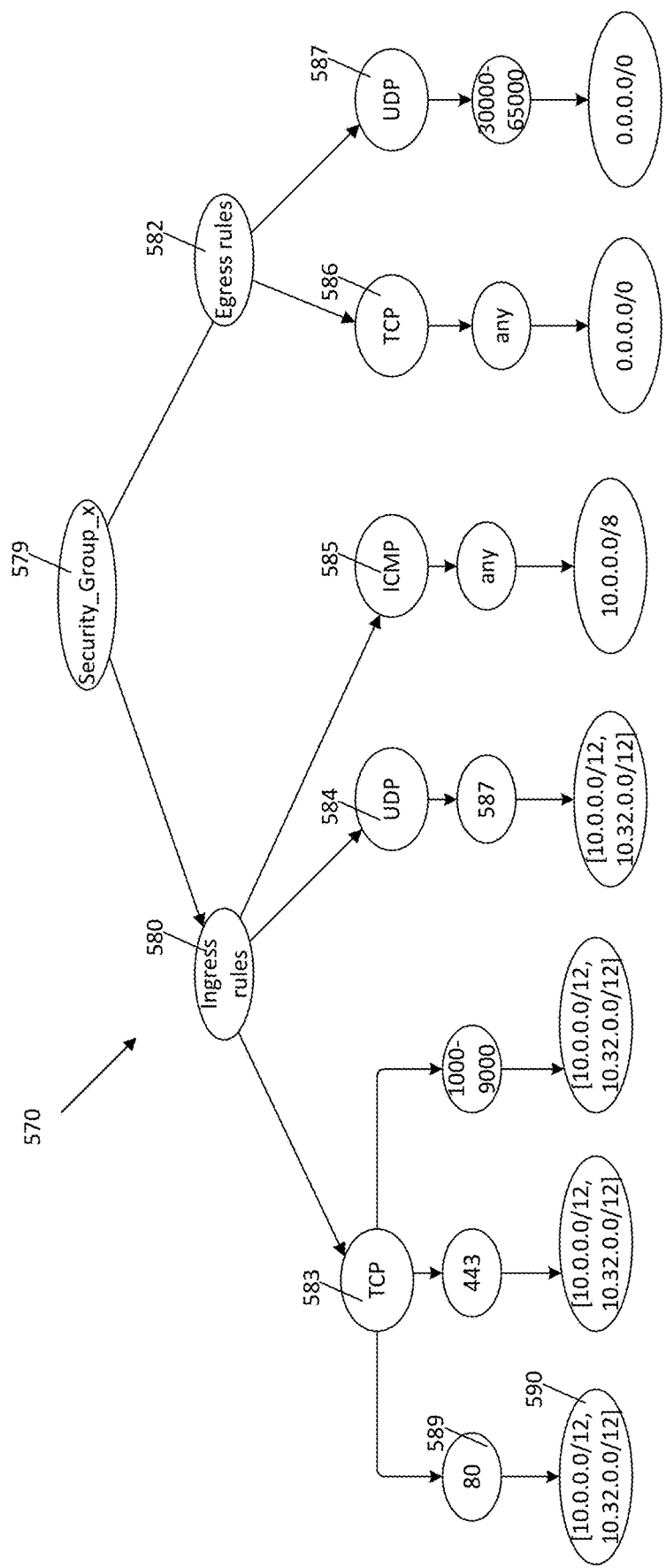

FIGS. 5C and 5D illustrate an example of a tree-based data structure 570 for an internal representation of a cloud-specific policy in accordance with some implementations of the disclosed subject matter. It should be noted that the nodes and branches, and the arrangement of the nodes and branches, shown in FIGS. 5C and 5D are merely exemplary. In some implementations, some nodes and/or branches of a tree-based data structure may be omitted. Additionally or alternatively, in some implementations, nodes and/or branches not shown in FIGS. 5C and 5D may be included.

As illustrated, tree-based data structure 570 includes a root node 572. Root node 574 includes various branches, each corresponding to a different data center instance, such as data center instances 573 and 574 as shown in FIG. 5B. Under each data center instance are various functional domain branches. For example, data center instance 573 includes branches corresponding to a function domain branch 576, corresponding to "bu_1." Continuing, each functional domain branch includes various security groups. For example, functional domain 576 includes a security group branch 578, indicated as "Security Group 1."

Turning to FIG. 5D, branches continuing from a security group are illustrated in accordance with some implementations. As illustrated, a security group branch 579 (indicated as "Security Group X") can have an ingress rule branch 580 and an egress rule branch 582. Each of ingress rule branch 580 and/or egress rule branch 582 can have one or more branches, each indicating a protocol or type of traffic for which a rule is specified. For example, ingress rule branch 580 can have branches 583, 584, and 585, corresponding to TCP, UDP, and ICMP, respectively. Similarly, egress rule branch 582 can have branches 586 and 587, corresponding to TCP and UDP, respectively. Each protocol or type of traffic branch can then have branches corresponding to ports. For example, branch 583, corresponding to inbound TCP traffic, can have a branch 589 that specifies port 80 as allowed. Each port can have a branch that indicates allowed subnets and/or allowed subnet ranges. For example, branch 589 has a branch 590 that indicates that subnets in the range of [10.0.0.0/12, 10.32.0.0/12] are allowed as inbound traffic.

Figure 6:
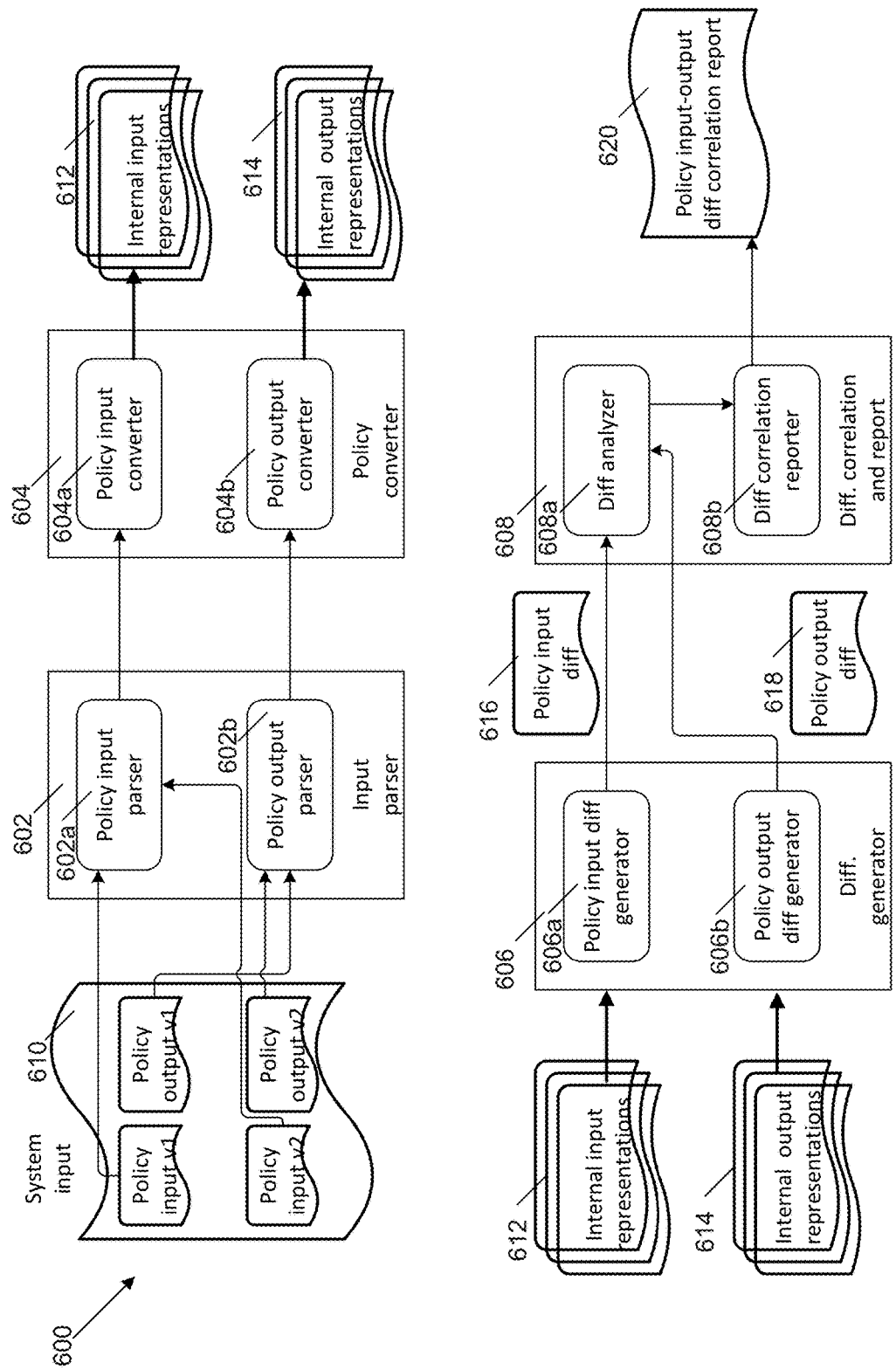
FIG. 6 shows a block diagram of an example of a network security system providing a framework for correlating security policy input changes and output changes, in accordance with some implementations.

FIG. 6 shows a schematic diagram of an example system 600 for correlation of security policy inputs and outputs. As illustrated, system 600 can include components such as an input parser 602, a policy converter 604, a difference generator 606, and a difference correlation and report generator 608.

Input parser 602 can take, as inputs, system input 610 that includes two versions of a policy input (labeled "Policy input v1" and "Policy input v2" in FIG. 6), and two versions of a policy output (labeled "Policy output v1" and "Policy output v2" in FIG. 6). As described above in connection with FIGS. 1, 4A, 4B, and 4C, the two versions of the policy input can be in any human-readable format, such as JSON, YAML, etc. As described above in connection with FIGS. 1, 5A, 5B, 5C, and 5D, the two versions of the policy output can be in a cloud-specific format, such as Terraform, and for a specific cloud type or architecture. Note that, although FIG. 6 shows two policy input versions and two policy output versions, in some implementations the system input can include more than two versions of a policy input and/or a policy output.

In some implementations, the two versions of the policy input can differ in various ways, for example, by adding or removing one or more services, adding or removing one or more policies, modifying one or more policies, etc. In some implementations, each version of the policy output can be generated based on a corresponding version of the policy input, using, for example, the techniques and components described above in connection with FIGS. 1 and 2.

Note that system input 610 can be in a format that associates a particular version of a security policy input with a corresponding version of a security policy output. For example, system input 610 can be in a format of:

{(policy_input_1_version1, policy_output_1_version1); (policy_input_1_version2, policy_output_1_version2)}.

In some implementations, input parser 602 can have sub-components, such as policy input parser 602a and policy output parser 602b. In some such implementations, policy input parser 602a can parse one or more versions of the policy input, and policy output parser 602b can parse one or more versions of the policy output.

Policy converter 604 can take the parsed versions of the policy input and the parsed versions of the policy output and can generate internal input representations 612 and internal output representations 614. In some implementations, policy converter 604 can have sub-components, such as policy input converter 604a and policy output converter 604b. In some such implementations, policy input converter 604a can generate internal input representations 612. Similarly, policy output converter 604b can generate internal output representations 614.

In some implementations internal input representations 612 can be in a tree-based data structure, as shown in and described above in connection with FIGS. 4A, 4B, and 4C. Similarly, in some implementations, internal output representations 614 can be in a tree-based data structure, as shown in and described above in connection with FIGS. 5A, 5B, 5C, and 5D.

Difference generator 606 can take, as inputs, internal input representations 612 and internal output representations 614, and can generate a policy input difference 616 and a policy output difference 618 that represent differences in the policy inputs and differences in the policy outputs, respectively. In some implementations, difference generator 606 can have sub-components, such as a policy input difference generator 606a and a policy output difference generator 606b. In some such implementations, policy input difference generator 606a can generate policy input difference 616 from internal input representations 612. Similarly, policy output difference generator 606b can generate policy output difference 618 from internal input representations 614. Note that more detailed techniques for generating policy input difference 616 and policy output difference 618 are shown in and described below in connection with FIG. 8.

Difference correlation and report generator 608 can take, as inputs, policy input difference 616 and policy output difference 618. Difference correlation and report generator 608 can then analyze and correlate differences indicated in policy input difference 616 with differences indicated in policy output difference 618 using difference analyzer 608a. The correlated differences can then be used by difference correlation reporter 608b to generate a policy input-output difference correlation report 620. As will be discussed in more detail in connection with FIGS. 9, 10A, and 10B, policy input-output difference correlation report 620 can indicate differences in the two versions of the policy output, and/or an expected impact or severity of implementing the changes in the policy input.

It should be noted that the output of the system for correlating security policy inputs and outputs (e.g., policy input-output difference correlation report 620) can be stored as a record in a database. For example, a report that indicates policy differences and/or impacts of each policy difference can be stored as a record in the database. In some implementations, a stored database record can include other relevant information, such as timestamp information indicating dates and/or times each version of a policy was submitted or generated, a username of a user that submitted or generated each policy, etc.

It should be further noted that the output of the system for correlating security policy inputs and outputs (e.g., policy input-output difference correlation report 620) can be used for many suitable purposes. For example, a generated report can be used by a network or security administrator to be able to quickly identify policy output differences that correspond to policy input differences associated with an updated version of a policy input submitted by a user. Continuing with this example, the generated report can be used by the administrator to determine whether the updated version is to be allowed or blocked by presenting the differences in an easily readable manner in connection with an impact or severity of each difference.

As another example, in some implementations, the output of the system can be used as an input to different systems. As a more particular example, a generated report can be used as an input to a system that presents the report in a manner formatted for a web portal or web dashboard. As another more particular example, a generated report can be used as an input to a system that uses machine learning to determine severity of network policy changes. In some implementations, such a machine learning system may be used to iteratively adjust assessed severity characteristics over time and may interact with the system for correlating security policy inputs and outputs.

Figure 7:
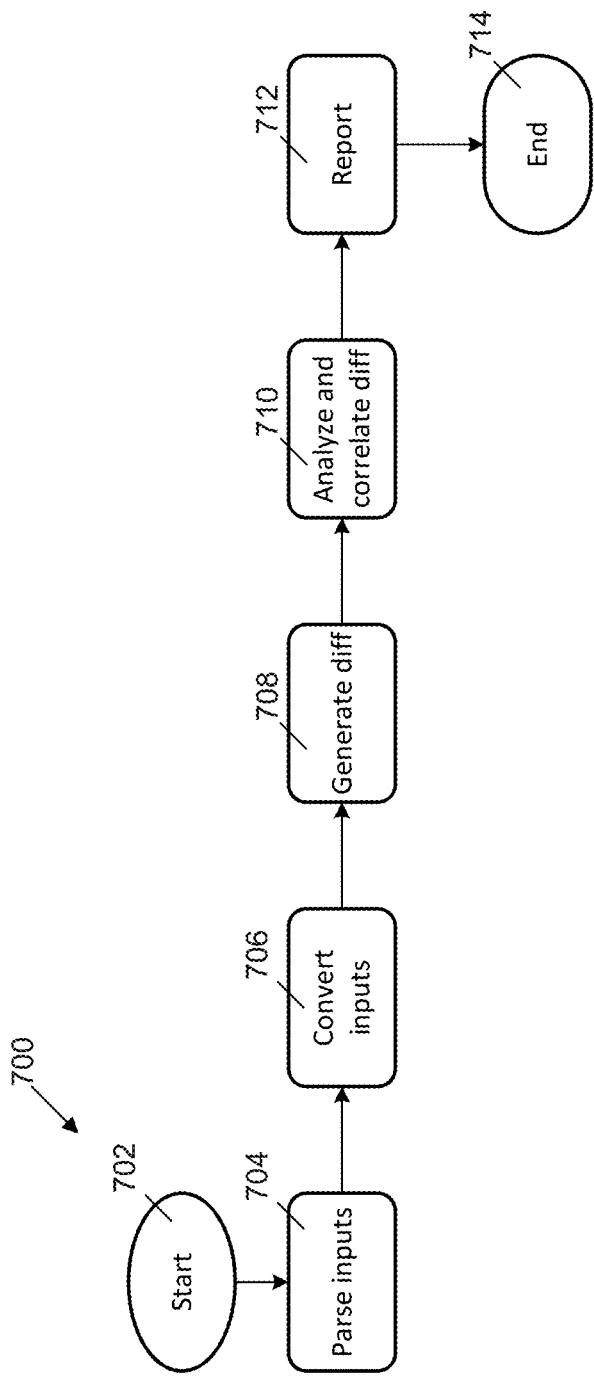
FIG. 7 shows a flowchart of an example of a method 700 for correlating security policy input changes and output changes, in accordance with some implementations.

FIG. 7 shows an example flowchart of a process 700 for correlation of security policy inputs and outputs in accordance with some implementations. In some implementations, blocks of process 700 can be executed on one or more servers that include one or more of the components shown in and described above in connection with FIG. 6.

Process 700 can begin at 702.

At 704, inputs can be parsed, for example, by input parser 602 of FIG. 6. For example, security policy inputs that correspond to versions of security policy inputs in a human-readable format can be parsed. As another example, security policy outputs that correspond to versions of security policy outputs in a cloud-specific format can be parsed.

At 706, the inputs can be converted, for example, by input converter 604 of FIG. 6. For example, one or more versions of security policy inputs can be converted to an internal input representation. As a more particular example, the one on more versions of security policy inputs can each be converted to a tree-based data structure format. As another example, one or more versions of security policy outputs can be converted to an internal output representation. As a more particular example, the one or more versions of security policy outputs can each be converted to a tree-based data structure format.

At 708, input differences and output differences can be generated, for example, by difference generator 606 of FIG. 6. For example, in some implementations, an input difference can be generated that indicates differences between two versions of a policy input. As another example, in some implementations, an output difference can be generated that indicates differences between two versions of a policy output. Note that more detailed techniques for generating input differences and output differences are shown in and described below in connection with FIG. 8.

At 710, the input differences and the output differences can be correlated, for example, by difference correlation and report generator 608 of FIG. 6. For example, in some implementations, an input difference can be matched with an output difference. As another example, for a given input difference and matched output difference, a severity of the difference can be identified. Note that more detailed techniques for correlating input differences and output differences are shown in and described below in connection with FIG. 9.

At 712, a report that indicates correlated input and output differences can be generated. Additionally, in some implementations, the report can include an anticipated severity of each correlated difference. Note that more detailed techniques for generating a report are shown in and described below in connection with FIG. 9. Additionally, an example of a report in JSON format is shown in and described below in connection with FIG. 10B.

The process can then end at 714.

Figure 8:
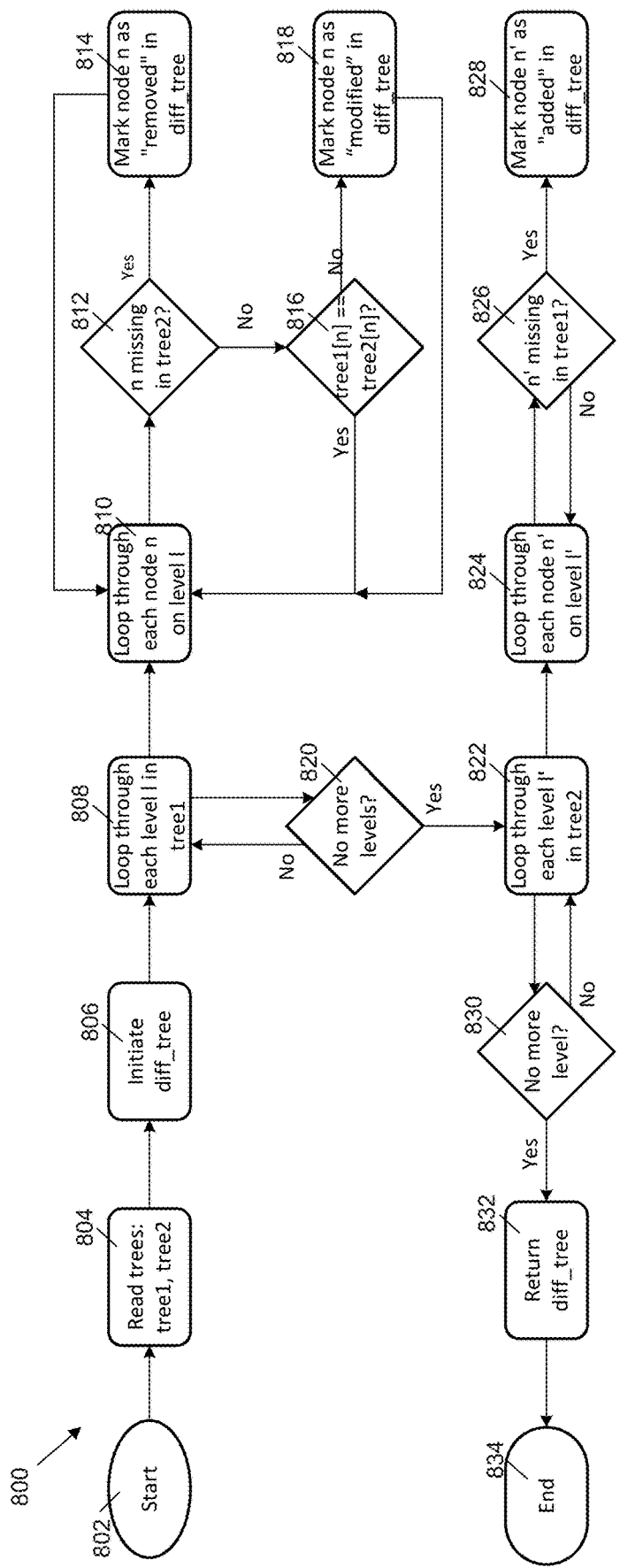
FIG. 8 shows a flowchart of an example of a method 800 for identifying differences between a pair of policy inputs or a pair of policy outputs, in accordance with some implementations.

FIG. 8 shows an example flowchart of a process 800 that can be used for identifying differences between two versions of a security policy. Note that process 800 can be applied to find differences between two versions of a security policy input and/or between two versions of a security policy output.

Process 800 can begin at 802.

At 804, two trees (referred to herein as "tree1" and "tree2") corresponding to two versions of a security policy represented in a tree-based data structure can be read. Note that an example of a tree-based data structure for a security policy input is shown in and described above in connection with FIGS. 4B and 4C, and an example of a tree-based data structure for a security policy output is shown in and described above in connection with FIGS. 5C and 5D.

At 806, a difference tree (referred to herein as "diff_tree") can be initiated. The difference tree can be a tree-based data structure that can, at an end of process 800, include nodes and branches that correspond to differences between the two versions of the security policy read at 804.

At 808, a loop through each level l in tree1 can be initiated. As shown in FIG. 8, the loop can include blocks 810-816.

At 810, a loop through each node n in level l of tree1 can be initiated. As shown in FIG. 8, the loop can include blocks 812-816.

Note that, by looping through each node n in level l, and each level l in tree1, each node and branch of tree1 can be analyzed.

At 812, a determination of whether node n is missing in tree2 can be made.

If, at 812, it is determined that node n is missing in tree2 ("yes" at 812), node n can be marked as "removed" in diff_tree at 814.

Conversely, if, at 812, it is determined that node n is not missing in tree2 ("no" at 812), a determination of whether node n in tree1 is the same as node n in tree2 can be made at 816.

If, at 816, it is determined that node n in tree1 is the same as node n in tree2 ("yes" at 816), the process can loop back to 810 and analyze the next node in level l of tree1.

Conversely, if, at 816, it is determined that node n in tree1 is not the same as node n in tree2 ("no" at 816), node n can be marked as modified in diff_tree at 818. The process can then loop back to 810 and can analyze the next node in level l of tree1.

After all nodes in level l of tree1 have been analyzed, process 800 can determine if there are no more levels in tree1 at 820.

If there are more levels in tree1 at 820 ("no" at 820), process 800 can go back to 808 and can loop through the nodes of the next level of tree1.

Conversely, if there are no more levels in tree1 at 820 ("yes" at 820), a loop through all levels l' of tree2 can be initiated at 822.

At 824, a loop through all nodes n' of each level l' of tree2 can be initiated.

At 826, for a given node n' in tree2, it can be determined if n' is missing in tree1.

If, at 826, it is determined that node n' is missing in tree1 ("yes" at 826), node n' can be marked as added in diff_tree at 828.

Conversely, if, at 826, it is determined that node n' is not missing in tree1 ("no" at 826), the process can return to 824 and can analyze the next node in level l'.

In response to determining that all nodes n' in a given level l' of tree2 have been analyzed, the process can proceed to 830 and can determine if there are no more levels in tree2.

If, at 830, it is determined that there are more levels ("no" at 830), the process can return to 822 and can analyze the next level in tree2.

Conversely, if, at 830, it is determined that there are no more levels ("yes" at 830), the difference tree (i.e., diff_tree) can be returned at 832. Note that, at 832, nodes of diff_tree indicate differences between tree1 and tree2. Accordingly, diff_tree represents differences between a second version of a security policy represented by tree2 and a first version of the security policy represented by tree 1.

Process 800 can end at 834.

Figure 9:
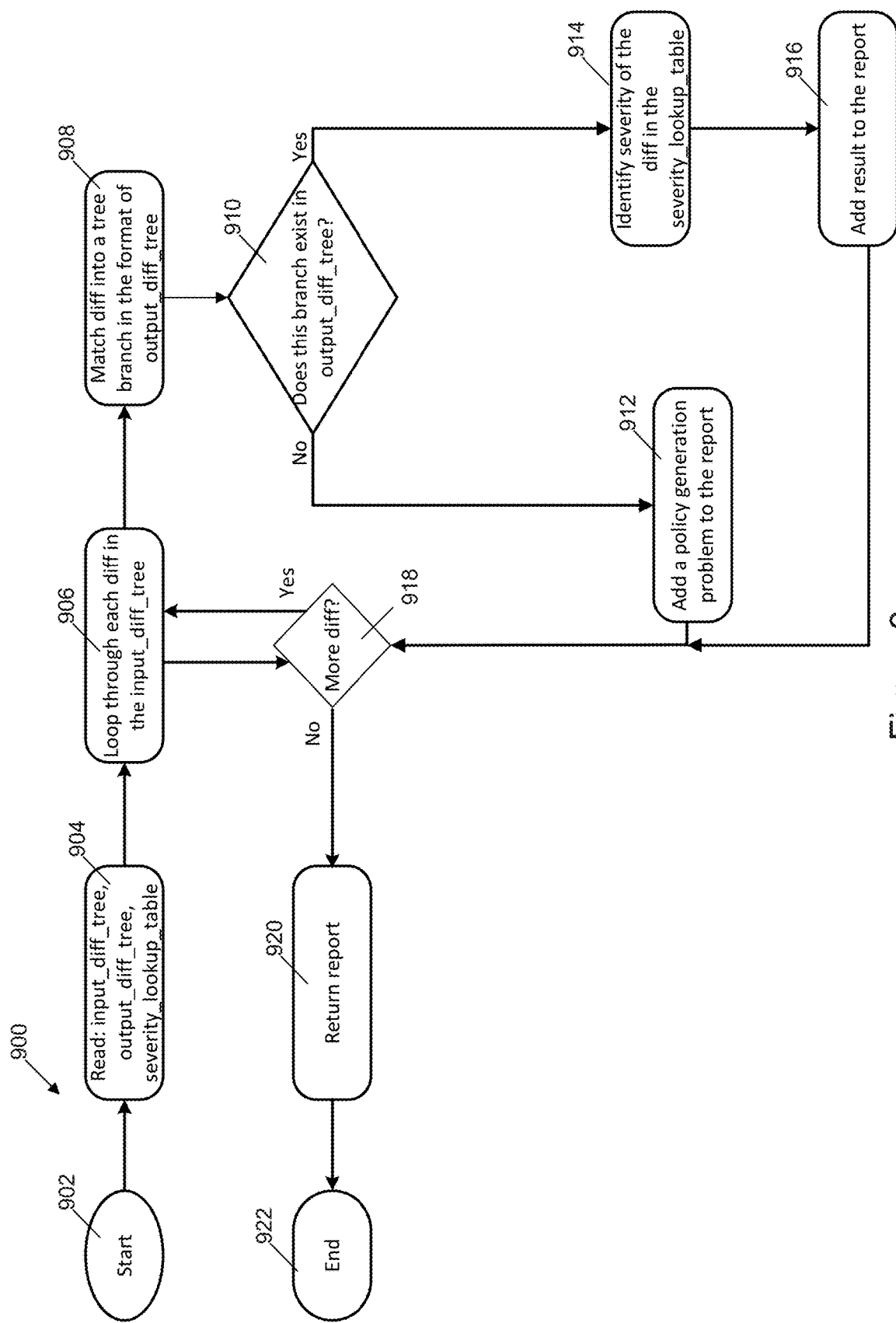
FIG. 9 shows a flowchart of an example of a method 900 for generating a report of correlation of security policy input and output changes, in accordance with some implementations.

Turning to FIG. 9, an example flowchart of a process 900 for correlating security policy input differences with security policy output differences is shown in accordance with some implementations of the disclosed subject matter. Note that, in some implementations, blocks of process 900 can be executed by components of one or more servers, such as a difference correlation and report generator, as shown in and described above in connection with FIG. 6.

Process 900 can begin at 902.

At 904, an input difference tree (referred to herein as "input_diff_tree"), an output difference tree (referred to herein as "output_diff_tree"), and a severity lookup table (referred to herein as "severity_lookup_table") can be read. The input difference tree can be a tree-format data structure that represents differences between two versions of a security policy input. The output difference tree can be a tree-format data structure that represents differences between two versions of a security policy output. Note that the input difference tree and the output difference tree can each be created using the techniques shown in and described above in connection with FIG. 8.

The severity lookup table can be a table that associates a severity characteristic with a type of difference in a policy output. For example, the severity lookup table can indicate that adding a service is a type of policy output difference that is of a low severity. As another example, the severity lookup table can indicate that removing a service is a type of policy output difference that is of a high severity. As yet another example, the severity lookup table can indicate that a policy change that modifies allowed ports to all ports and/or to a larger number of ports is a type of policy output difference that is of a high severity.

It should be noted that a severity lookup table can be generated in various ways. For example, in some implementations, a severity lookup table can be manually curated. As another example, in some implementations, a severity lookup table can be generated using various heuristics that associated severity characteristics to different types of policy differences. As yet another example, in some implementations, a severity lookup table can be generated using one or more machine learning algorithms trained to assign severity characteristics to different types of policy differences.

At 906, a loop through each difference node in input_diff_tree can be initiated.

At 908, for a given difference node in input_diff_tree, the difference node can be matched to a corresponding branch or node in output_diff_tree.

At 910, it can be determined whether the corresponding branch or node exists in output_diff_tree.

If, at 910, it is determined that the corresponding branch or node does not exist in output_diff_tree ("no" at 910), a policy generation problem can be added to a report at 912. For example, the policy generation problem can indicate that a policy output difference that corresponds to the policy input difference associated with the difference node being analyzed was found. The process can then proceed to 918 to determine if there are additional differences to analyze in input_diff_tree.

Conversely, if, at 910, it is determined that the corresponding branch or node does exist in output_diff_tree ("yes" at 910), a severity of the policy difference can be identified using the severity lookup table at 914. For example, the identified corresponding branch or node in output_diff_tree can be mapped to a type of policy output difference (e.g., addition of service, removal of service, addition of allowed ports, removal of allowed ports, etc.). Continuing with this example, the severity of the type of policy output difference can be identified by using the type of policy output difference as a key with respect to the severity lookup table.

Process 900 can then add the identified severity to a record or report at 916. In some implementations, the identified severity can be added in connection with an indication of the policy output difference and/or the type of policy output difference.

Process 900 can then proceed to 918 and can determine if there are additional differences in input_diff_tree to analyze.

If, at 918, it is determined that there are additional differences in input_diff_tree ("yes" at 918), process 900 can loop back to 906 and can analyze the next difference in input_diff_tree. In some implementations, process 900 can loop through blocks 906-918 until the entirety of input_diff_tree has been traversed.

Conversely, if, at 918, it is determined that there are no additional differences in input_diff_tree ("no" at 918), process 900 can return the record or report at 920. Note that, at 920, the record or report can indicate all policy output differences that have been matched to a policy input difference. Additionally, as described above in connection with block 914, the record or report can indicate a corresponding severity of each policy output difference. Furthermore, in instances in which a policy output difference could not be identified for a given policy input difference, the record or report can include an indication of such.

Note that, an example of a report is shown in and described below in connection with FIG. 10B.

Process 900 can end at 922.

FIG. 10A illustrates an example of changes to a policy input in JSON format in accordance with some implementations of the disclosed subject matter. It should be noted that the strikethrough and dashed lines shown in FIG. 10A are merely included to highlight changes. In particular, portions of the JSON code that are shown in strikethrough in FIG. 10A show portions that are to be removed, and portions of the JSON code that are shown in dashed boxes show portions that are to be added. In effect, what is shown in FIG. 10A after removing the strikethrough portions and adding what is shown in dashed boxes can be considered a second version of a policy input. Correspondingly, the first version of the policy input would be what is shown in FIG. 10A with the strikethrough portions remaining, and the portions in the dashed boxes removed.

At 1002 and 1004, "service11" has been removed from the "Security_Group_2" security group. In particular, at 1002, "service11" is removed from the list of service names, and, at 1004, port and protocol information associated with the "service11" instance is removed.

At 1006 and 1008, a new service, named "service14" is added to the "Security_Group_2" security group. In particular, at 1006, "service14" is added to the list of service names, and, at 1008, port and protocol information associated with "service14" is added.

At 1010, a new policy is added to the "Security_Group_2" security group. As illustrated in FIG. 10A, the new policy includes destination and source information, each of which specifies allowed service instances.

FIG. 10B shows an example of a system output report 1050 in JSON format that can be generated based on the policy input changes shown in FIG. 10A in accordance with some implementations of the disclosed subject matter. Note that system output report 1050 is an example of a report that can be generated by difference correlation and report generator 608 as shown in FIG. 6 using the techniques shown in and described above in connection with FIGS. 7, 8, and 9.

Referring to system output report 1050, beginning at 1051, identified changes are shown. For example, beginning at 1052, the removal of "service11" from "Security_Group_2" is indicated. In particular, an assessed severity is shown at 1054. Additionally, details of the removed service (e.g., a description, a type of traffic associated with the removed service, a type of protocol associated with the removed service, port information, etc.) is shown at 1056.

As another example, beginning at 1058, the addition of "service14" from "Security_Group_2" is indicated. In particular, an assessed severity is shown at 1060. Additionally, details of the added service (e.g., a description, a type of traffic associated with the added service, a type of protocol associated with the added service, port information, etc.) is shown at 1062.

Continuing further, system output report 1050 shows changes associated with the policy added to "Security_Group_2" beginning at 1064. An assessed severity is shown at 1066. At 1068 and 1070, changes to the designated subnet ranges are indicated as a result of the added policy.

It should be noted that a system output report, such as that shown in FIG. 10B can be presented in any suitable format to a user to highlight various items in the system output report. For example, various portions of a system output report can be highlighted (e.g., in particular colors, in particular fonts, etc.) to emphasize changes indicated in the system output report based on assessed severity. For example, changes assigned a "high" severity can be formatted to appear in red, whereas changes assigned a "medium" or "low" severity can be formatted to appear in black or another color. As another example, changes assigned a "high" severity can be formatted to appear at a higher position or an earlier position within the system output report relative to changes assigned a "medium" or "low" severity.

Figure 11:
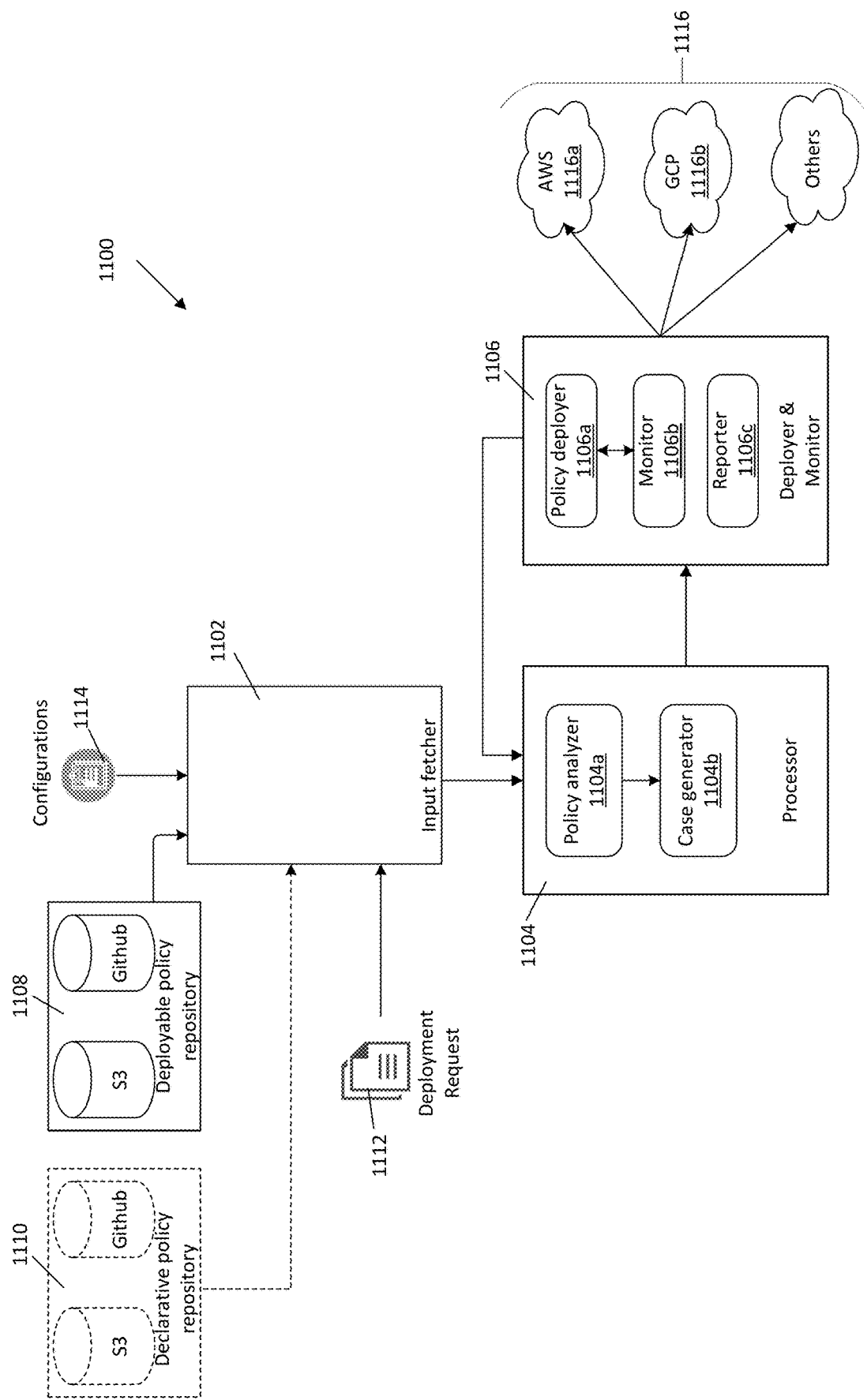
FIG. 11 shows a block diagram of an example of a system 1100 for automation of cloud network security policy analysis and deployment in accordance with some implementations.

Turning to FIG. 11, an example of system 1100 that can be used for automation of network security policy analysis and deployment is shown in accordance with some implementations of the disclosed subject matter. As illustrated, system 1100 includes various components, such as an input fetcher 102, a processor 1104, and a deployer and monitor 1106.

Input fetcher 1102 can be configured to fetch various inputs. For example, as illustrated in FIG. 11, input fetcher 1102 can retrieve one or more versions of a cloud-specific policy output (generally referred to herein as a "policy output" or a "security policy output") from deployable policy repository 1108. In some implementations, a first version of a policy output can correspond to a version that was previously deployed to a cloud, and a second version of a policy output can correspond to a new version that is to be analyzed and potentially deployed.

Note that the one or more versions of the policy output retrieved from deployable policy repository can correspond to security policy outputs that have been translated to a cloud-specific format. The cloud-specific format can be in Terraform, and/or any other suitable format. Additionally, note that techniques for generating each version of the cloud-specific policy outputs are shown in and described above in connection with FIGS. 1 and 2.

As another example, in some implementations, input fetcher 1102 can retrieve one or more versions of a policy input in a human-readable format from declarative policy repository 1110. Note that the one or more versions of the policy input can be in a human-readable format, such as JSON or YAML. Examples of policy inputs that can be retrieved from declarative policy repository 1110 are shown in and described above in connection with FIGS. 3A and 3B.

Note that, as shown in FIG. 11, policies (either policy inputs or policy outputs) that are stored in a repository, such as deployable policy repository 1108 and/or declarative policy repository 1110, can be stored in any suitable repository or storage system, such as a Github repository, cloud storage (e.g., an AWS S3 bucket, etc.), etc.

As yet another example, in some implementations, input fetcher 1102 can retrieve a deployment request 1112. In some implementations, deployment request 1112 can be a request by a user (e.g., a developer, an engineer, etc.) to deploy a particular security policy. Deployment request 1112 can include various information, such as a data center instance related to the policy to be deployed, subdomain/subnetwork information that is to be changed, a service associated with the policy change, etc. In some implementations, deployment request 1112 can be received via a user interface, such as a form of a web dashboard or website.

As still another example, in some implementations, input fetcher 1102 can retrieve a configurations file 1114. Configurations file 1114 can indicate information that such as times/days for policy deployment on different data centers, rules for automated deployment of policies, etc. Configurations file 1114 may be created, modified, and/or updated by a system administrator who manages security policy deployment on particular cloud services.

In some implementations, configurations file 1114 can be in a human-readable format, such as JSON, YAML, etc.

Note that in some implementations, some inputs shown in FIG. 11 and described above can be omitted and/or not retrieved by input fetcher 1102. For example, in some implementations, any of the policy inputs from declarative policy repository 1110, deployment request 1112 and/or configurations file 1114 can be omitted.

Processor 1104 can be configured to receive inputs from input fetcher 1102, and can be configured to: analyze differences in two versions of a security policy output; and generate a case corresponding to the change in the security policy output. In some implementations, processor 1104 can include various sub-components, such as a policy analyzer 1104a and a case generator 1104b that can be configured to analyze differences in two versions of a security policy output and to generate a case corresponding to the change in the security policy output, respectively.

In some implementations, policy analyzer 1104a can analyze two versions of a security policy output retrieved by input fetcher 1102 (e.g., a previously deployed version and a new version that is to be analyzed and potentially deployed). In particular, policy analyzer 1104a can determine changes between a previously deployed version and a new version. Policy analyzer 1104a can determine changes between the two version of the security policy output by, for example, identifying differences between internal representations of each of the two versions. As a more particular example, policy analyzer 1104a can identify differences in individual nodes and/or branches of a tree-based data structure representing the first version of the security policy output relative to a tree-based data structure representing the second version of the security policy output. Note that more detailed techniques for identifying differences between two internal representations of security policies are shown in and described above in connection with FIG. 8.

In some implementations, after determining changes between the two versions of the security policy output, policy analyzer 1104a can assign a severity level to the changes. The severity level can be assigned using various techniques. For example, in some implementations, as shown in and described above in connection with block 914 of FIG. 9, a severity characteristic can be identified from a look-up table that associates a type of security policy change with a particular severity characteristic. As another example, in some implementations, the severity level can be assigned using a trained machine learning algorithm (e.g., a trained classifier, a trained neural network, etc.) that has been trained to classify particular types of security policy changes as belonging to a particular severity level. In some implementations, such an algorithm can be trained using manually annotated data that indicates, for example, a severity level of different types of security policy changes.

Examples of severity characteristics can include: "high severity," "medium severity," and/or "low severity." In some implementations, a severity characteristic can be or can include a severity score, such as a numeric score (e.g., a number within the range of 0 to 10, a number within the range of 0 to 100, etc.) that indicates a degree of severity of the change.

Examples of security policy changes that can be assigned a high severity level (e.g., a "high severity" classification, a numeric score that indicates a high severity, etc.) can include: removal of a service, allowing new or additional internet traffic, etc. Examples of security policy changes that can be assigned a medium or low severity level (e.g., a "medium severity" classification, a "low severity" classification, a numeric score that indicates a medium or low severity, etc.) can include: addition of a service, addition of a data center, blocking particular ports of traffic, blocking particular communication protocols, etc. It should be noted, however, that a classification of a severity level of a security policy change may be dependent on various other factors, such as an anticipated impact to external parties, etc. For example, blocking a particular port of traffic may be assigned a relatively higher severity level in response to determining that blocking the port of traffic may cause disruption to one or more external parties (e.g., a customer, etc.) that use the port.

In some implementations, policy analyzer 1104a can assign a severity level or a severity characteristic to each change in a new version of a security policy output relative to a previously deployed version. For example, in an instance in which the current version has three changes (e.g., a removal of a first service, an addition of a second service, and a change in allowed ports of a third service), policy analyzer 1104a can assign a severity level to each change. In some implementations, policy analyzer 1104a can assign an aggregate severity level to the new version of the security policy output that is based on the individual severity levels of each identified difference. For example, in some implementations, an aggregate severity level can be the highest or most severe of each of the individual severity levels. As another example, in some implementations, in an instance in which severity levels include numeric severity scores, an aggregate severity level can be an average (e.g., a mean, a median, a mode, a weighted average, etc.) of the individual severity levels.

Note that, in some implementations, policy analyzer 1104a can analyze changes in two versions of a security policy output in the context of changes in corresponding versions of security policy inputs (i.e., the human-readable security policy inputs that were used to generate the two versions of the security policy output), if retrieved by input fetcher 1102. In some such implementations, policy analyzer 1104a can identify differences between the two versions of the security policy inputs, identify differences between the two versions of the security policy outputs, and can then correlate the differences in the security policy inputs to differences in the security policy outputs, as shown in and described above in connection with FIGS. 7-9. However, in instances in which input fetcher 1102 did not retrieve corresponding versions of the security policy input, policy analyzer 1104a can be configured to analyze the versions of the security policy outputs without consideration of the corresponding versions of the security policy inputs. Note that, in some implementations, analyzing changes in two versions of a security policy output in the context of changes in corresponding versions of security policy inputs may provide benefits, such as identifying one or more entities who specified the change, a reason the change was made, a time the change was made, etc., which may provide additional context for analyzing the two versions of the security policy output.

Referring back to FIG. 11, case generator 1104b can generate a case corresponding to a new version of a security policy output. In some implementations, the case can be a report or a ticket that indicates information about the new version of the security policy output, such as an indication of changes between the new version and the previously deployed version, an indication of a severity level for each change, an indication of an aggregate severity level for the new version of the security policy output, etc.

In some implementations, case generator 1104b can cause the report or ticket to be presented in various manners or formats. For example, in some implementations, case generator 1104b can be configured to cause an email that includes the generated report or ticket to be transmitted to a user charged with approval of various security policy deployments. As another example, in some implementations, case generator 1104b can be configured to cause the report or ticket to be presented as part of a web dashboard or web interface that indicates various security policy outputs to be deployed. Note that an example of such as user interface is shown in and described below in connection with FIG. 13A.

Deployer and monitor 1106 can receive a report or ticket generated by case generator 1104b. In some implementations, deployer and monitor 1106 can include various sub-components, such as policy deployer 1106a, monitor 1106b, and/or reporter 1106c.

Policy deployer 1106a can deploy a new version of the security policy output to various cloud resources 1116 (e.g., AWS 1116a, GCP 1116b, etc.). In some implementations, policy deployer 1106a can take a new version of a security policy output that is in a cloud-specific format (e.g., in a Terraform format, etc.), and can run any suitable agents or software that call cloud-specific APIs to deploy the new version of the security policy output to the specific cloud resource. Note that, in some implementations, aspects of policy deployer 1106a can include third-party products, such as Spinnaker, or other suitable deployment products.

Note that, in some implementations, policy deployer 1106a can be configured to automatically deploy (i.e. without manual approval) a new version of a security policy output in response to determining that the severity level or severity characteristic assigned by processor 1104 is below a predetermined level. For example, policy deployer 1106a can be configured to automatically deploy a new version of a security policy output that is assigned a "low severity" characteristic and/or a "medium severity" characteristic. Conversely, in some implementations, policy deployer 1106a can block automated deployment of a new version of a security policy output in response to determining that the new version of the security policy output has been assigned a severity level or severity characteristic that exceeds a predetermined threshold. For example, policy deployer 1106a can block automated deployment of a new version of a security policy output that has been assigned a "high severity" characteristic. In some such implementations, the report or ticket generated by case generator 1104b can include an option (e.g., a selectable user interface button) that can allow for manual deployment of the new version of the security policy output after manual review, as shown in and described below in connection with FIG. 13A.

Monitor 1106b can be configured to monitor a status of a deployed version of a security policy output. For example, in response to determining that deployment of a particular version of a security policy output has generated an error, monitor 1106b can be configured to attempt to retry deployment a predetermined number of times (e.g., two more times, three more times, etc.). Additionally or alternatively, in some implementations, monitor 1106b can be configured to transmit an error message to a particular user, such as an administrator of system 1100.

Reporter 1106c can be configured to generate a report that indicates deployments of various security policy outputs. For example, in some implementations, such a report can include information related to a particular deployed security policy output, such as a timestamp of the deployment, a severity level assigned to the security policy output, whether the deployment was in response to an automated approval or a manual approval, etc. As another example, in some implementations, the report can indicate whether a deployment of a particular security policy output was successful or if an error occurred. In some implementations, reporter 1106c can generate a report that includes an aggregation of deployed security policy outputs (or attempted deployments) over any suitable time period (e.g., over the past day, over the past week, etc.). In some implementations, a report generated by reporter 1106c can be presented in various formats, such as an emailed report, within a user interface of a web dashboard or website, etc.

Figure 12:
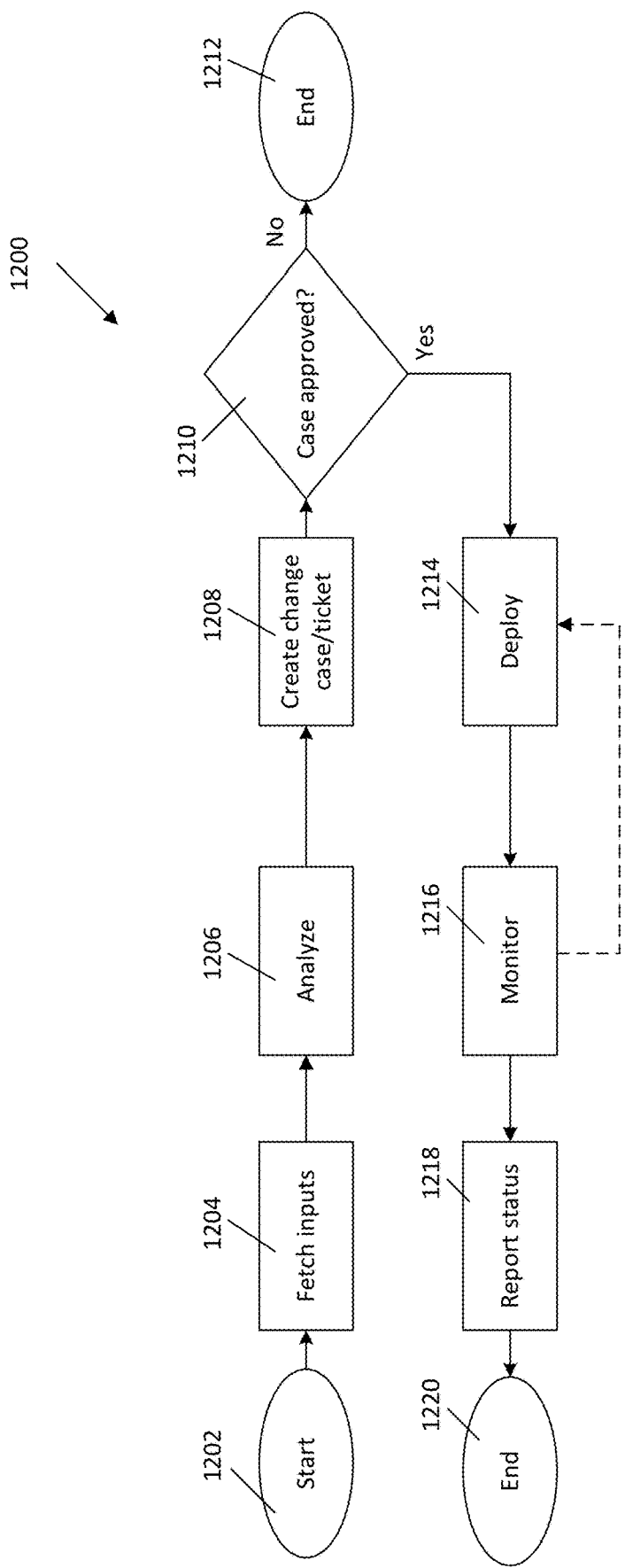
FIG. 12 shows a flowchart of an example of a method 1200 for automation of cloud network security policy analysis and deployment in accordance with some implementations.

FIG. 12 shows an example of process 1200 for automation of analysis and deployment of security policies in accordance with some implementations. Note that blocks of process 1200 can be implemented by various components shown in and described above in connection with FIG. 11.

Process 1200 can begin at 1202.

At 1204, inputs can be fetched, using, for example, input fetcher 1102 of FIG. 11. As described above in connection with FIG. 11, the inputs can include two versions of a security policy output, corresponding to a previously deployed version, and a new version that that has been requested for deployment. Additionally, in some embodiments, the inputs can include corresponding versions of a security policy input (e.g., a security policy in human-readable format), a configuration file, and/or a deployment request submitted by a user that indicates the new version of the security policy output and/or any other suitable information.

At 1206, the inputs can be analyzed, using, for example, policy analyzer 1104a of FIG. 11. For example, differences between the two versions of the security policy output can be identified. Note that more detailed techniques for identifying differences between the two versions of the security policy output are shown in and described above in connection with FIG. 8. For example, in some implementations, differences can be identified by traversing tree-based data structures corresponding to each version to identify nodes and/or branches that differ between the two versions.

In some implementations, identified differences between the two versions of the security policy output can be assigned severity levels or severity characteristics. For example, in some implementations, each identified difference can be assigned a severity level or severity characteristic such as "low severity," "medium severity," "high severity," etc.

In some implementations, the severity level can be assigned based on a look-up table that associates a type of change in the security policy output with a security level. Additionally or alternatively, in some implementations, the severity level can be assigned based on a trained machine learning algorithm.

Note that, in some implementations, an aggregate severity level or severity characteristic can be assigned to the new version of the security policy output based on the individual severity levels of each identified difference.

At 1208, a report or change ticket can be generated, for example, by case generator 1104b. In some implementations, the report or the change ticket can include information such as information associated with the new version of the security policy output (e.g., a timestamp associated with a deployment request, a username of a user who submitted a deployment request, information indicating a cloud-services type to which the security policy output is to be applied, etc.). Additionally or alternatively, in some implementations, the report or the change ticket can indicate assigned severity levels for each identified difference between the new version of the security policy output and the previously deployed version of the security policy output and/or an aggregate severity level for the new version of the security policy output. In some implementations, the report or the change ticket can be presented in any suitable format, such as within an email transmitted to a system administrator or other user, within a web dashboard or website, etc.

At 1210, a determination of whether the case is approved can be made. In some implementations, the approval can be automated. For example, in some implementations, a determination that the case is approved can be made based on an automated approval in response to determining that an assigned severity level of the new version of the security policy output is below a severity threshold (e.g., that the new version has been assigned a "low severity," a "medium severity," etc.). Note that, in some implementations, rules for automated approval of a case can be indicated in a configurations file retrieved at block 1202. For example, the configurations file can indicate that a new version of a policy output is to be automatically approved and/or deployed if the new version of the policy output is assigned a particular severity level or characteristic (e.g., "low severity," "medium severity," etc.).

Additionally or alternatively, in some implementations, approval can be manual. For example, in some implementations, a determination that the case has been approved can be made based on a receipt of a manual approval of the case (e.g., via a web form or web dashboard that presented the report described above in connection with block 1208).

Note that, in some implementations, process 1200 can determine that a case has not been approved based on an explicit determination that the new version of the security policy output is not to be deployed. For example, in some implementations, such a determination may be in response to receiving an indication from a user in connection with a manual review of the new version of the security policy output (e.g., an indication received via a web form or a web dashboard, as shown in and described below in connection with FIG. 13A). In some implementations, process 1200 can wait at block 1210 until a manual review of the new version of the security policy output has indicated whether the case is approved or not approved.

If, at 1210, it is determined that the case has not been approved ("no" at 1210), the process can end at 1212.

Conversely, if, at 1210, it is determined that the case has been approved ("yes" at 1210), the new version of the security policy output can be deployed at 1214. For example, the new version of the security policy output, in a cloud-specific format, can be deployed to specific cloud instances using APIs associated with each cloud instance.

At 1216, deployment of the new version of the security policy output can be monitored. For example, any errors in deployment of the new version of the security policy output can be identified. Note that, in instances in which the deployment was not successful (e.g., due to an error being identified at 1216), process 1200 can loop back to 1214 and can attempt another deployment of the new version of the security policy output. In some such implementations, deployment can be retried a predetermined number of times (e.g., three times, five times, etc.). In some implementations, in response to determining that deployment has been tried more than the predetermined number of times without success, process 1200 can end with, for example, a timeout error.

At 1218, a status of the deployment of the new version of the security policy output can be reported. For example, in an instance in which the new version of the security policy output was successfully deployed, the status can be reported as successful. Conversely in an instance in which the new version of the security policy output was not successfully deployed, the status can be reported as unsuccessful.

Process 1200 can then end at 1220.

In some implementations, the status can be indicated in a report. For example, the report can aggregate the status of security policy output deployments over any suitable parameters. As a more particular example, the report can aggregate deployments for particular cloud services, particular data centers, particular functional domains, etc. As another example, the report can aggregate deployments over a particular time period (e.g., over the past day, over the past week, etc.). In some implementations, the report can be presented in various formats, such as in an email, within a user interface of a web dashboard or website, etc.

It should be noted that the techniques, operations, and components shown in and described above in connection with FIGS. 11 and 12 may be applied to automated analysis and deployment of other items, such as product updates, firmware updates, etc. For example, in an instance in which a product update is to be deployed, policy analyzer 1104a as shown in and described above in connection with FIG. 11 may be replaced with a product analyzer. Continuing with this example, in some implementations, such a product analyzer may identify differences between a new product version to be deployed and a previously deployed version. Continuing still further with this example, in some implementations, the differences can be assigned severity levels or severity characteristics. Continuing still further with this example, a system may determine, based on the severity level(s), whether approval of deployment of the product update is to be granted automatically (i.e., without manual review and approval), or whether approval is to be given after manual review. In some implementations, in response to determining that the product update has been approved, the product update can be deployed to any suitable devices.

Figure 13A:
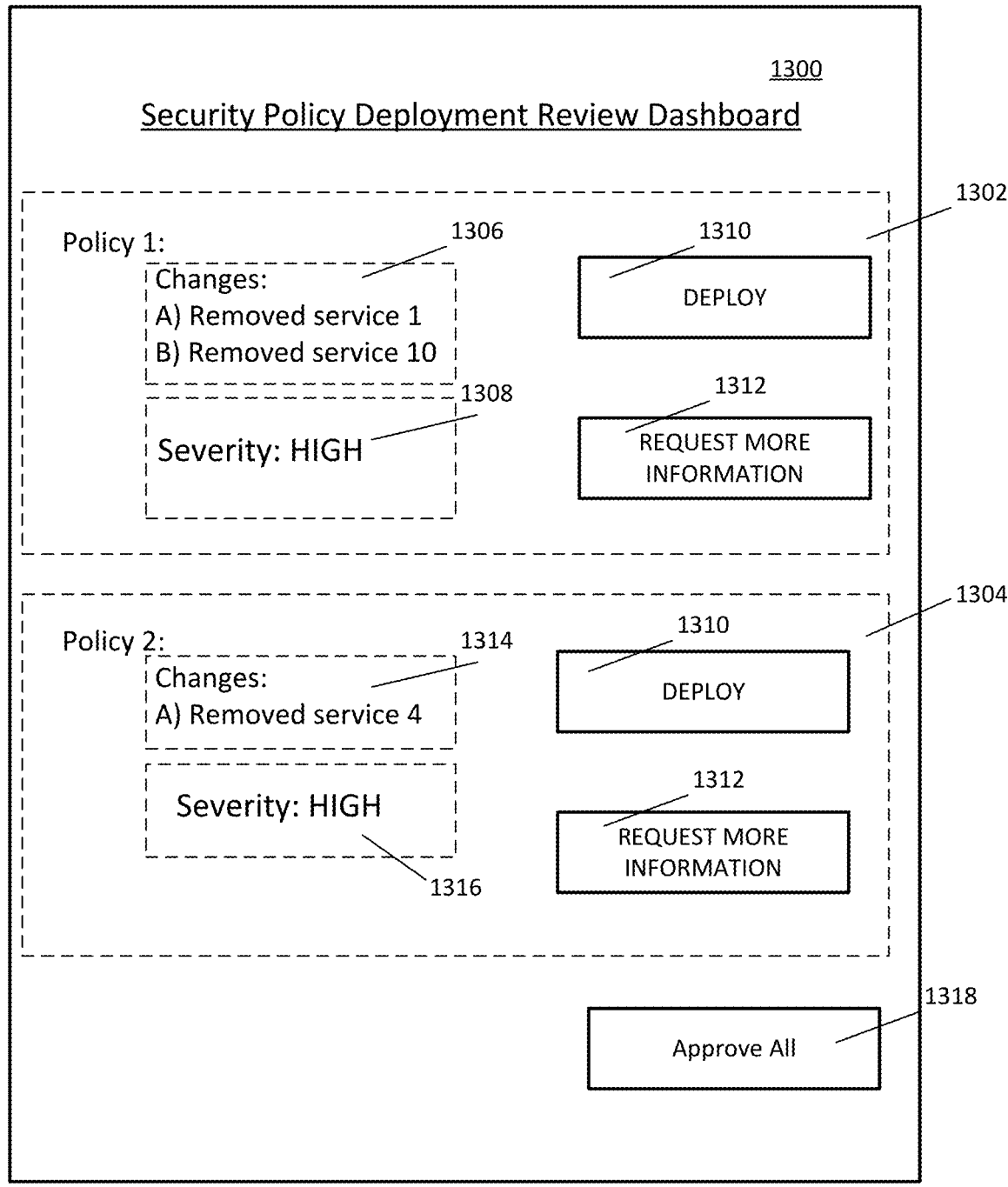
FIG. 13A shows an example of a user interface 1300 that can indicate various security policy output changes to be deployed in accordance with some implementations.

FIG. 13A shows an example of a user interface 1300 for presenting statuses of various security policy outputs in accordance with some implementations.

At illustrated, user interface 1300 includes a first panel 1302 that indicates information associated with a first policy (referred to as "Policy 1" in FIG. 13A), and a second panel 1304 that indicates information associated with a second policy (referred to as "Policy 2" in FIG. 13A). Note that, although two panels are shown in user interface 1300 for readability, in some implementations, any suitable number (e.g., one, five, ten, etc.) of panels can be included.

Referring to panel 1302, information related to Policy 1 can be indicated. For example, changes 1306 can indicate identified differences between a new version of Policy 1 and a previously deployed version of Policy 1. Additionally, a severity characteristic 1308 indicates an assigned severity level of the new version of Policy 1. Note that although severity characteristic 1308 indicates a severity level of the new version of Policy 1 in aggregate, in some implementations, a severity for each identified difference in changes 1306 can be indicated.

As shown in panel 1302, selectable inputs 1310 and 1312 can be included to allow manual approval to deploy the new version of Policy 1, or request additional information associated with the new version of Policy 1, respectively. In some implementations, selectable inputs 1310 and 1312 can be presented in response to determining that automated approval of the new version of Policy 1 was not granted.

Referring to panel 1304, information related to Policy 2 can be indicated. For example, changes 1314 can indicate an identified difference between a new version of Policy 2 and a previously deployed version of Policy 2. Additionally, a severity characteristic 1316 indicates an assigned severity level of the new version of Policy 2. Note that although severity characteristic 1316 indicates a severity level of the new version of Policy 2 in aggregate, in some implementations, a severity for each identified difference in changes 1314 can be indicated. Panel 1304 also includes selectable inputs 1310 and 1312 for allowing manual approval to deploy the new version of Policy 2, or to request additional information associated with the new version of Policy 2.

User interface 1300 additionally includes a selectable input 1318 to approve all policies indicated in user interface 1300 (e.g., Policy 1 and Policy 2 of user interface 1300). In some implementations, in response to determining that selectable input 1318 has been selected, both Policy 1 and Policy 2 can be deployed.

FIG. 13B shows an example of user interface 1350 that can be used to indicate deployment status of various security policy outputs in accordance with some implementations. In some implementations, user interface 1350 can be presented as a web dashboard that indicates a deployment status of various security policy outputs.

As illustrated, in some implementations, user interface 1350 can include pipeline information 1352 that indicates data center associated with a particular security policy output. In some implementations, pipeline information 1352 can additionally or alternatively include more granular pipeline information, such as relevant functional domains, as illustrated in FIG. 13B.

As illustrated, in some implementations, user interface 1350 can include change case information 1354. In some implementations, change case information 1354 can indicate a change ticket generated during automated analysis of a corresponding security policy output. In some implementations, change case information 1354 may be a hyperlink that, when selected, causes additional details of the corresponding security policy output to be presented.

As illustrated, in some implementations, user interface 1350 can include deployment status information 1356. In some implementations, deployment status information 1356 can indicate whether a corresponding network security policy output was successfully deployed, or whether deployment was unsuccessful.

As illustrated, in some implementations, user interface 1350 can include timing information 1358 and 1360. Timing information 1358 and 1360 can indicate a deployment start time and a deployment end time, respectively.

In some implementations, user interface 1350 can include any other information not shown in FIG. 13B, such as an assigned severity level associated with a particular security policy output, etc.

Note that, in some implementations, user interface 1300 can be presented in various formats. For example, in some implementations, user interface 1300 can be presented within an email transmitted to a user charged with review of security policies. As another example, in some implementations, user interface 1300 can be presented within a web dashboard or a website.

Figure 14A:
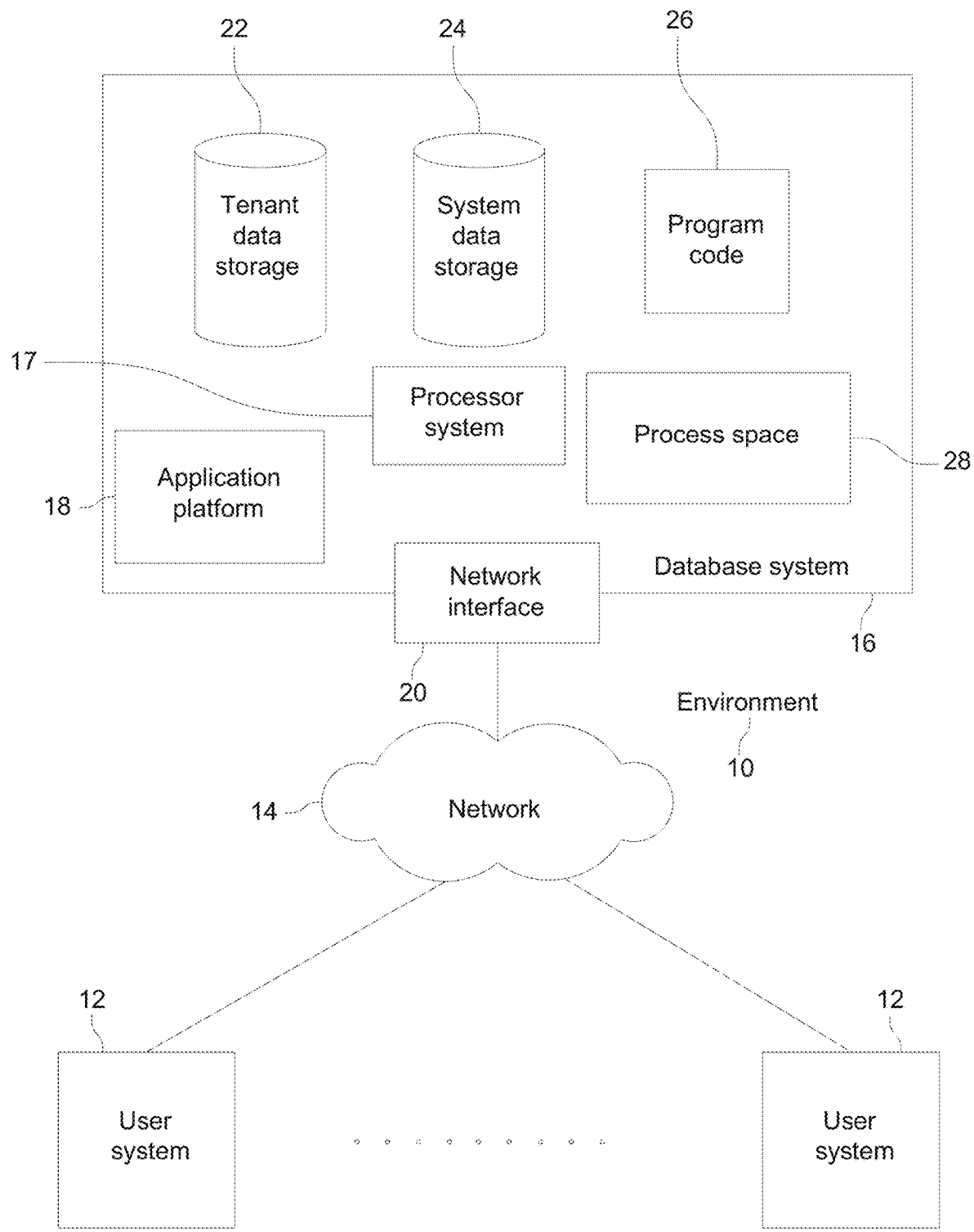
FIG. 14A shows a block diagram of an example of an environment 10 in which an on-demand database service can be used in accordance with some implementations.

FIG. 14A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a workstation and/or a network of computing devices. As illustrated in FIG. 14A (and in more detail in FIG. 14B) user systems 12 might interact via a network 14 with an on-demand database service, which is implemented in the example of FIG. 14A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 14A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 14B:
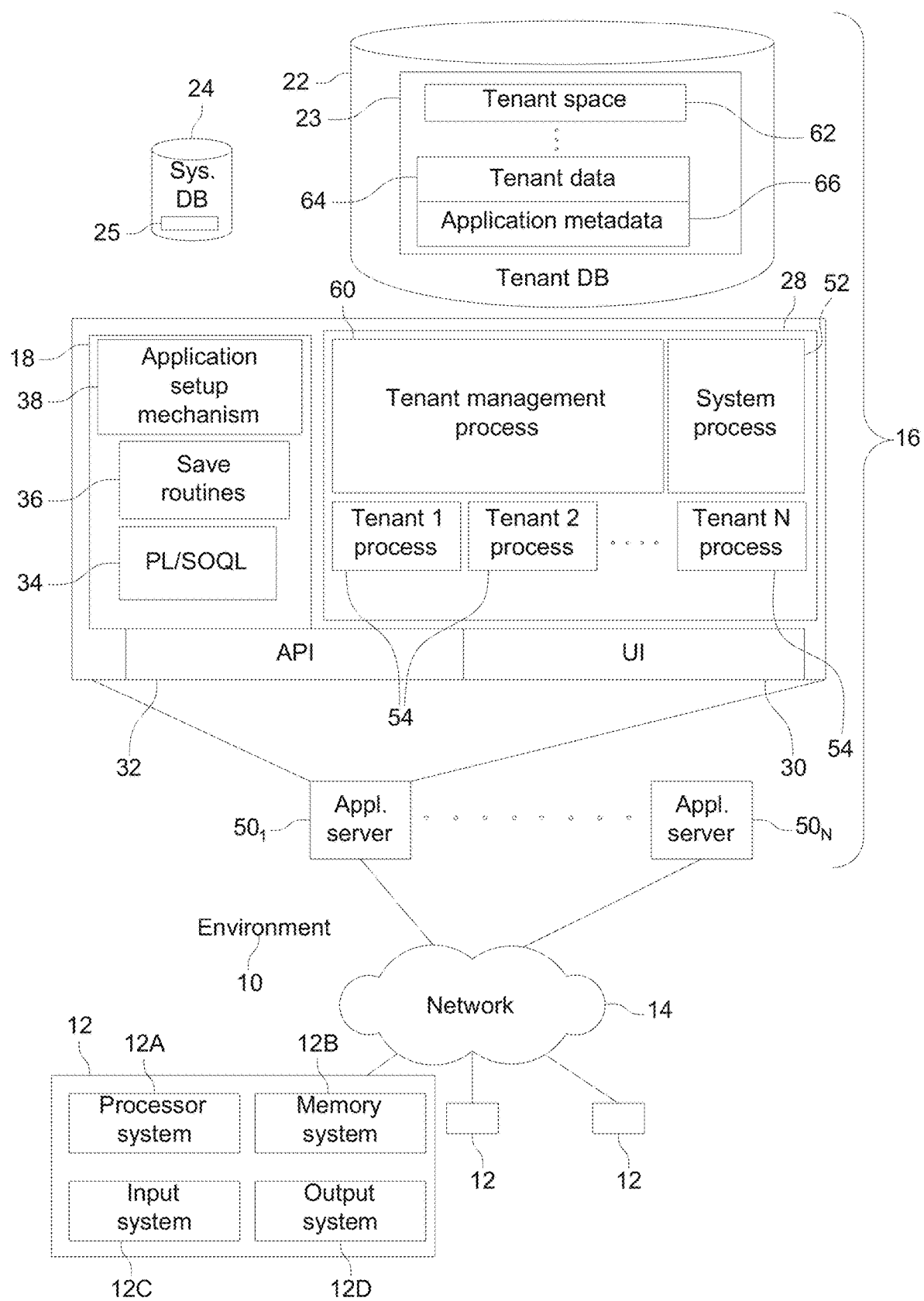
FIG. 14B shows a block diagram of an example of some implementations of elements of FIG. 14A and various possible interconnections between these elements.

One arrangement for elements of system 16 is shown in FIGS. 14A and 14B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 14A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 14B shows a block diagram of an example of some implementations of elements of FIG. 14A and various possible interconnections between these elements. That is, FIG. 14B also illustrates environment 10. However, in FIG. 14B elements of system 16 and various interconnections in some implementations are further illustrated. FIG. 14B shows that user system 12 may include processor system 12A, memory system 12B, input system 12C, and output system 12D. FIG. 14B shows network 14 and system 16. FIG. 14B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 14A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 14B, system 16 may include a network interface 20 (of FIG. 14A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of an MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 15A:
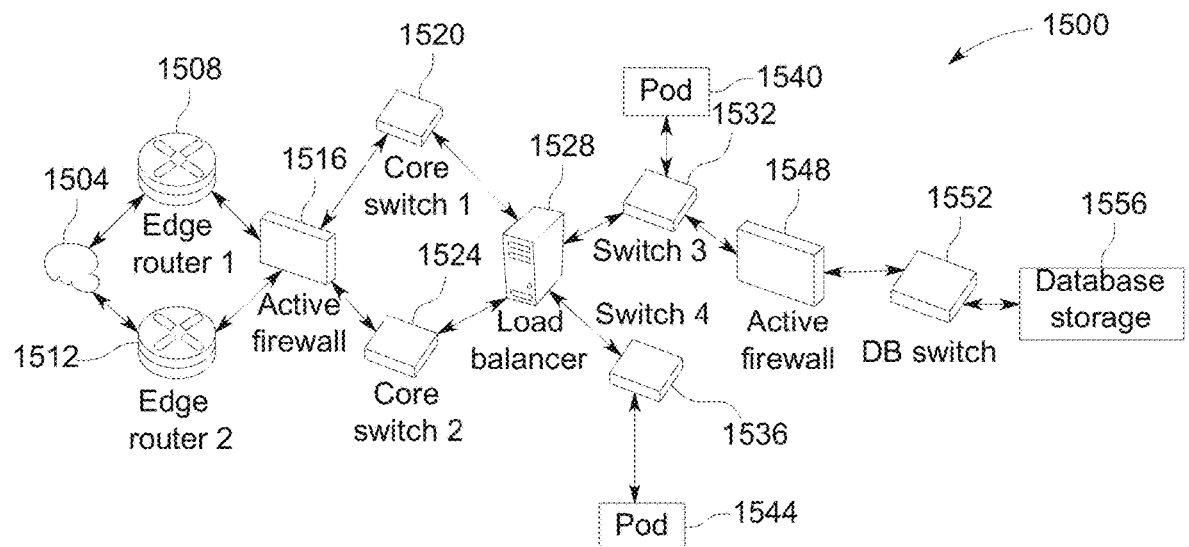
FIG. 15A shows a system diagram of an example of architectural components of an on-demand database service environment 1500, in accordance with some implementations.

FIG. 15A shows a system diagram of an example of architectural components of an on-demand database service environment 1500, in accordance with some implementations. A client machine located in the cloud 1504, generally referring to one or more networks in combination, as described herein, may communicate with the on-demand database service environment via one or more edge routers 1508 and 1512. A client machine can be any of the examples of user systems 12 described above. The edge routers may communicate with one or more core switches 1520 and 1524 via firewall 1516. The core switches may communicate with a load balancer 1528, which may distribute server load over different pods, such as the pods 1540 and 1544. The pods 1540 and 1544, which may each include one or more servers and/or other computing resources, may perform data processing and other operations used to provide on-demand services. Communication with the pods may be conducted via pod switches 1532 and 1536. Components of the on-demand database service environment may communicate with a database storage 1556 via a database firewall 1548 and a database switch 1552.

Figure 15B:
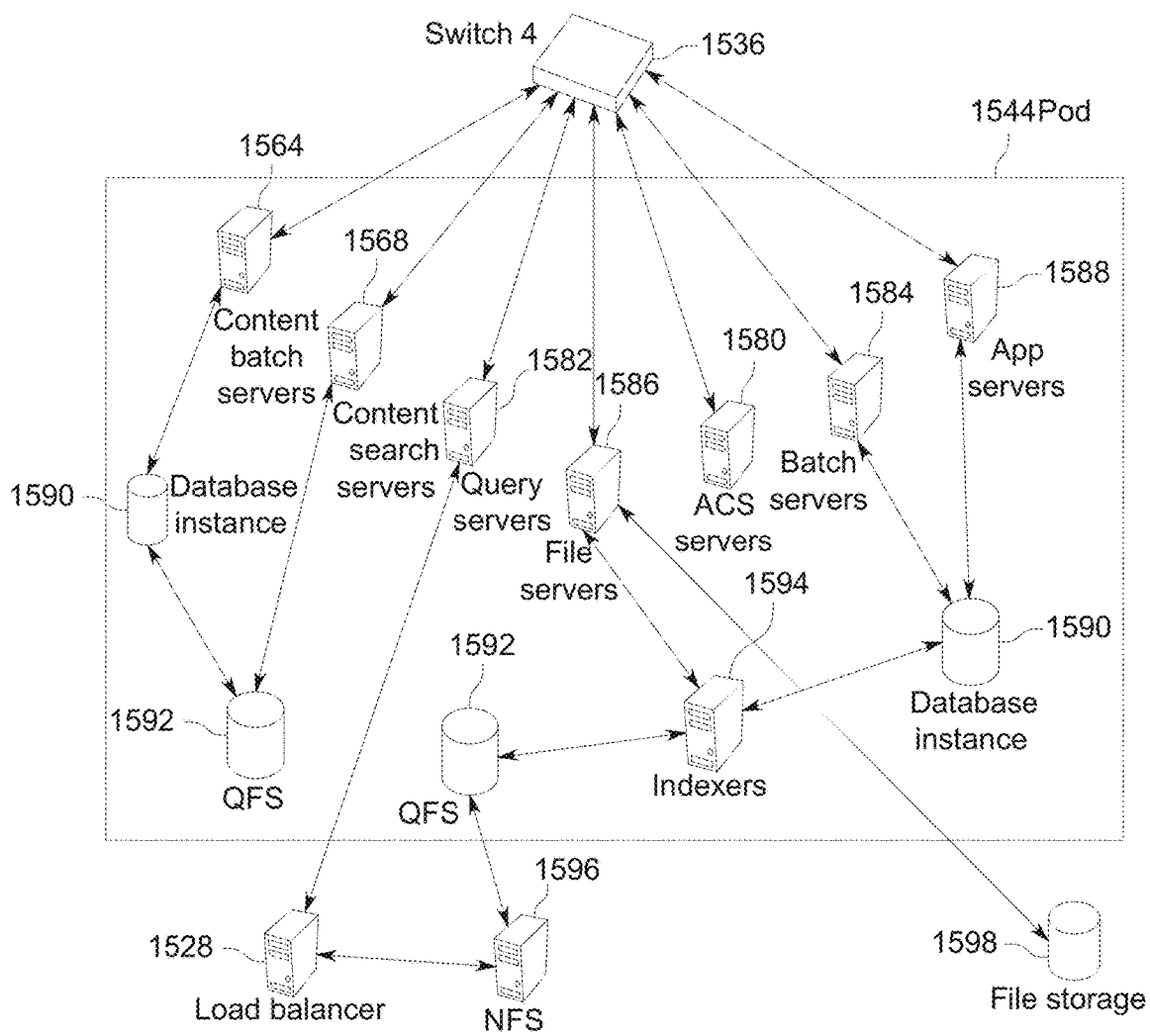
FIG. 15B shows a system diagram further illustrating an example of architectural components of an on-demand database service environment, in accordance with some implementations.

As shown in FIGS. 15A and 15B, accessing an on-demand database service environment may involve communications transmitted among a variety of different hardware and/or software components. Further, the on-demand database service environment 1500 is a simplified representation of an actual on-demand database service environment. For example, while only one or two devices of each type are shown in FIGS. 15A and 15B, some implementations of an on-demand database service environment may include anywhere from one to many devices of each type. Also, the on-demand database service environment need not include each device shown in FIGS. 15A and 15B, or may include additional devices not shown in FIGS. 15A and 15B.

Moreover, one or more of the devices in the on-demand database service environment 1500 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 1504 is intended to refer to a data network or combination of data networks, often including the Internet. Client machines located in the cloud 1504 may communicate with the on-demand database service environment to access services provided by the on-demand database service environment. For example, client machines may access the on-demand database service environment to retrieve, store, edit, and/or process information.

In some implementations, the edge routers 1508 and 1512 route packets between the cloud 1504 and other components of the on-demand database service environment 1500. The edge routers 1508 and 1512 may employ the Border Gateway Protocol (BGP). The BGP is the core routing protocol of the Internet. The edge routers 1508 and 1512 may maintain a table of IP networks or 'prefixes', which designate network reachability among autonomous systems on the Internet.

In one or more implementations, the firewall 1516 may protect the inner components of the on-demand database service environment 1500 from Internet traffic. The firewall 1516 may block, permit, or deny access to the inner components of the on-demand database service environment 1500 based upon a set of rules and other criteria. The firewall 1516 may act as one or more of a packet filter, an application gateway, a stateful filter, a proxy server, or any other type of firewall.

In some implementations, the core switches 1520 and 1524 are high-capacity switches that transfer packets within the on-demand database service environment 1500. The core switches 1520 and 1524 may be configured as network bridges that quickly route data between different components within the on-demand database service environment. In some implementations, the use of two or more core switches 1520 and 1524 may provide redundancy and/or reduced latency.

In some implementations, the pods 1540 and 1544 may perform the core data processing and service functions provided by the on-demand database service environment. Each pod may include various types of hardware and/or software computing resources. An example of the pod architecture is discussed in greater detail with reference to FIG. 15B.

In some implementations, communication between the pods 1540 and 1544 may be conducted via the pod switches 1532 and 1536. The pod switches 1532 and 1536 may facilitate communication between the pods 1540 and 1544 and client machines located in the cloud 1504, for example via core switches 1520 and 1524. Also, the pod switches 1532 and 1536 may facilitate communication between the pods 1540 and 1544 and the database storage 1556.

In some implementations, the load balancer 1528 may distribute workload between the pods 1540 and 1544. Balancing the on-demand service requests between the pods may assist in improving the use of resources, increasing throughput, reducing response times, and/or reducing overhead. The load balancer 1528 may include multilayer switches to analyze and forward traffic.

In some implementations, access to the database storage 1556 may be guarded by a database firewall 1548. The database firewall 1548 may act as a computer application firewall operating at the database application layer of a protocol stack. The database firewall 1548 may protect the database storage 1556 from application attacks such as structure query language (SQL) injection, database rootkits, and unauthorized information disclosure.

In some implementations, the database firewall 1548 may include a host using one or more forms of reverse proxy services to proxy traffic before passing it to a gateway router. The database firewall 1548 may inspect the contents of database traffic and block certain content or database requests. The database firewall 1548 may work on the SQL application level atop the TCP/IP stack, managing applications' connection to the database or SQL management interfaces as well as intercepting and enforcing packets traveling to or from a database network or application interface.

In some implementations, communication with the database storage 1556 may be conducted via the database switch 1552. The multi-tenant database storage 1556 may include more than one hardware and/or software components for handling database queries. Accordingly, the database switch 1552 may direct database queries transmitted by other components of the on-demand database service environment (e.g., the pods 1540 and 1544) to the correct components within the database storage 1556.

In some implementations, the database storage 1556 is an on-demand database system shared by many different organizations. The on-demand database service may employ a multi-tenant approach, a virtualized approach, or any other type of database approach. On-demand database services are discussed in greater detail with reference to FIGS. 15A and 15B.

FIG. 15B shows a system diagram further illustrating an example of architectural components of an on-demand database service environment, in accordance with some implementations. The pod 1544 may be used to render services to a user of the on-demand database service environment 1500. In some implementations, each pod may include a variety of servers and/or other systems. The pod 1544 includes one or more content batch servers 1564, content search servers 1568, query servers 1582, file servers 1586, access control system (ACS) servers 1580, batch servers 1584, and app servers 1588. Also, the pod 1544 includes database instances 1590, quick file systems (QFS) 1592, and indexers 1594. In one or more implementations, some or all communication between the servers in the pod 1544 may be transmitted via the switch 1536.

The content batch servers 1564 may handle requests internal to the pod. These requests may be long-running and/or not tied to a particular customer. For example, the content batch servers 1564 may handle requests related to log mining, cleanup work, and maintenance tasks.

The content search servers 1568 may provide query and indexer functions. For example, the functions provided by the content search servers 1568 may allow users to search through content stored in the on-demand database service environment.

The file servers 1586 may manage requests for information stored in the file storage 1598. The file storage 1598 may store information such as documents, images, and basic large objects (BLOBs). By managing requests for information using the file servers 1586, the image footprint on the database may be reduced.

The query servers 1582 may be used to retrieve information from one or more file systems. For example, the query system 1582 may receive requests for information from the app servers 1588 and then transmit information queries to the NFS 1596 located outside the pod.

The pod 1544 may share a database instance 1590 configured as a multi-tenant environment in which different organizations share access to the same database. Additionally, services rendered by the pod 1544 may call upon various hardware and/or software resources. In some implementations, the ACS servers 1580 may control access to data, hardware resources, or software resources.

In some implementations, the batch servers 1584 may process batch jobs, which are used to run tasks at specified times. Thus, the batch servers 1584 may transmit instructions to other servers, such as the app servers 1588, to trigger the batch jobs.

In some implementations, the QFS 1592 may be an open source file system available from Sun Microsystems® of Santa Clara, California. The QFS may serve as a rapid-access file system for storing and accessing information available within the pod 1544. The QFS 1592 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 1568 and/or indexers 1594 to identify, retrieve, move, and/or update data stored in the network file systems 1596 and/or other storage systems.

In some implementations, one or more query servers 1582 may communicate with the NFS 1596 to retrieve and/or update information stored outside of the pod 1544. The NFS 1596 may allow servers located in the pod 1544 to access information to access files over a network in a manner similar to how local storage is accessed.

In some implementations, queries from the query servers 1522 may be transmitted to the NFS 1596 via the load balancer 1528, which may distribute resource requests over various resources available in the on-demand database service environment. The NFS 1596 may also communicate with the QFS 1592 to update the information stored on the NFS 1596 and/or to provide information to the QFS 1592 for use by servers located within the pod 1544.

In some implementations, the pod may include one or more database instances 1590. The database instance 1590 may transmit information to the QFS 1592. When information is transmitted to the QFS, it may be available for use by servers within the pod 1544 without using an additional database call.

In some implementations, database information may be transmitted to the indexer 1594. Indexer 1594 may provide an index of information available in the database 1590 and/or QFS 1592. The index information may be provided to file servers 1586 and/or the QFS 1592.

In some implementations, one or more application servers or other servers described above with reference to FIGS. 14A and 14B include a hardware and/or software framework configurable to execute procedures using programs, routines, scripts, etc. Thus, in some implementations, one or more of application servers $50_1$-$50_N$ of FIG. 14B can be configured to implement components and initiate performance of one or more of the operations described above with reference to FIGS. 1-13 by instructing another computing device to perform an operation. In some implementations, one or more application servers $50_1$-$50_N$ carry out, either partially or entirely, one or more of the disclosed operations described with reference to FIGS. 1-13. In some implementations, app servers 1588 of FIG. 15B support the construction of applications provided by the on-demand database service environment 1500 via the pod 1544. Thus, an app server 1588 may include a hardware and/or software framework configurable to execute procedures to partially or entirely carry out or instruct another computing device to carry out one or more operations disclosed herein, including operations described above with reference to FIGS. 1-13. In alternative implementations, two or more app servers 1588 may cooperate to perform or cause performance of such operations. Any of the databases and other storage facilities described above with reference to FIGS. 14A, 14B, 15A and 15B can be configured to store lists, articles, documents, records, files, and other objects for implementing the operations described above with reference to FIGS. 1-13. For instance, lists of available communication channels associated with share actions for sharing a type of data item can be maintained in tenant data storage 22 and/or system data storage 24 of FIGS. 14A and 14B. By the same token, lists of default or designated channels for particular share actions can be maintained in storage 22 and/or storage 24. In some other implementations, rather than storing one or more lists, articles, documents, records, and/or files, the databases and other storage facilities described above can store pointers to the lists, articles, documents, records, and/or files, which may instead be stored in other repositories external to the systems and environments described above with reference to FIGS. 14A, 14B, 15A and 15B.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory (ROM) devices and random access memory (RAM) devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system comprising:
one or more memory devices; and
a server system comprising one or more processors in communication with the one or more memory devices, the server system configurable to cause:
obtaining a system input comprising:
a first version of a policy output, and
a second version of the policy output,
each version of the policy output comprising a version of a cloud-specific policy set specific to one of a plurality of clouds of different cloud providers;
generating a severity characteristic associated with deployment of the second version of the policy output to one of the plurality of clouds based on one or more differences between the first version of the policy output and the second version of the policy output, wherein the severity characteristic indicates an impact of at least one type of change associated with the one or more differences between the first version of the policy output and the second version of the policy output;
determining that the second version of the policy output is to be deployed without manual review of the second version of the policy output based on a determination that the severity characteristic indicative of the impact of the at least one type of change associated with the one or more differences between the first version and the second version is below a predetermined threshold; and
in response to determining that the second version of the policy output is to be deployed, deploying the second version of the policy output to the one of the plurality of clouds.

2. The system of claim 1, the server system further configurable to cause:
generating a report that includes the severity characteristic, wherein the report is generated based on the one or more differences between the first version of the policy output and the second version of the policy output; and
causing the report to be transmitted to a user device.

3. The system of claim 2, wherein causing the report to be transmitted to the user device comprises causing the report to be presented in a website that presents a dashboard related to a set of security policies.

4. The system of claim 1, the server system further configurable to cause:
designating each of the one or more differences between the first version of the policy output and the second version of the policy output as one of a plurality of types of changes; and
determining, for each of the one or more differences, the severity characteristic based on the type of change associated with the difference.

5. The system of claim 4, wherein the severity characteristic is retrieved from a table that associates a severity characteristic with each of the plurality of types of changes.

6. The system of claim 1, wherein the server system is further configurable to cause:
obtaining additional system input comprising a third version of the policy output;
generating a second severity characteristic that indicates a severity of deploying the third version of the policy output to the one of the plurality of clouds based on one or more differences between the second version of the policy output and the third version of the policy output;
determining whether to deploy the third version of the policy output based on the second severity characteristic; and
in response to determining that the third version of the policy output is not to be deployed, causing a report that indicates the one or more differences to be transmitted to a user device.

7. The system of claim 6, wherein the server system is further configurable to cause:
receiving, from the user device, an instruction to deploy the third version of the policy output; and
deploying the third version of the policy output to the one of the plurality of clouds in response to receiving the instruction from the user device.

8. A non-transitory computer-readable medium comprising instructions, which, when executed by one or more processors cause performance of:
obtaining a system input comprising:
a first version of a policy output, and
a second version of the policy output,
each version of the policy output comprising a version of a cloud-specific policy set specific to one of a plurality of clouds of different cloud providers;
generating a severity characteristic associated with deployment of the second version of the policy output to one of the plurality of clouds based on one or more differences between the first version of the policy output and the second version of the policy output, wherein the severity characteristic indicates an impact of at least one type of change associated with the one or more differences between the first version of the policy output and the second version of the policy output;
determining that the second version of the policy output is to be deployed without manual review of the second version of the policy output based on a determination that the severity characteristic indicative of the impact of the at least one type of change associated with the one or more differences between the first version and the second version is below a predetermined threshold, wherein the at least one type of change comprises at least one of: an addition of a service, a removal of a service, allowing new traffic to access a provider, blocking one or more ports of traffic, blocking one or more particular communication protocols, or any combination thereof; and
in response to determining that the second version of the policy output is to be deployed, deploying the second version of the policy output to the one of the plurality of clouds.

9. The non-transitory computer-readable medium of claim 8, the instructions further configurable to cause:
generating a report that includes the severity characteristic, wherein the report is generated based on the one or more differences between the first version of the policy output and the second version of the policy output; and
causing the report to be transmitted to a user device.

10. The non-transitory computer-readable medium of claim 9, wherein causing the report to be transmitted to the user device comprises causing the report to be presented in a website that presents a dashboard related to a set of security policies.

11. The non-transitory computer-readable medium of claim 8, the instructions further configurable to cause:

designating each of the one or more differences between the first version of the policy output and the second version of the policy output as one of a plurality of types of changes; and determining, for each of the one or more differences, the severity characteristic based on the type of change associated with the difference.

12. The non-transitory computer-readable medium of claim 11, wherein the severity characteristic is retrieved from a table that associates a severity characteristic with each of the plurality of types of changes.

13. The non-transitory computer-readable medium of claim 8, the instructions further configurable to cause:

obtaining additional system input comprising a third version of the policy output;

generating a second severity characteristic that indicates a severity of deploying the third version of the policy output to the one of the plurality of clouds based on one or more differences between the second version of the policy output and the third version of the policy output;

determining whether to deploy the third version of the policy output based on the second severity characteristic; and in response to determining that the third version of the policy output is not to be deployed, causing a report that indicates the one or more differences to be transmitted to a user device.

14. The non-transitory computer-readable medium of claim 13, the instructions further configurable to cause:

receiving, from the user device, an instruction to deploy the third version of the policy output; and deploying the third version of the policy output to the one of the plurality of clouds in response to receiving the instruction from the user device.

15. A method comprising:

obtaining a system input comprising:
a first version of a policy output, and
a second version of the policy output,
each version of the policy output comprising a version of a cloud-specific policy set specific to one of a plurality of clouds of different cloud providers;

generating a severity characteristic associated with deployment of the second version of the policy output to one of the plurality of clouds based on one or more differences between the first version of the policy output and the second version of the policy output, wherein the severity characteristic indicates an impact of at least one type of change associated with the one or more differences between the first version of the policy output and the second version of the policy output;

determining that the second version of the policy output is to be deployed without manual review of the second version of the policy output based on a determination that the severity characteristic indicative of the impact of the at least one type of change associated with the one or more differences between the first version and the second version is below a predetermined threshold; and in response to determining that the second version of the policy output is to be deployed, deploying the second version of the policy output to the one of the plurality of clouds.

16. The method of claim 15, further comprising:

generating a report that includes the severity characteristic, wherein the report is generated based on the one or more differences between the first version of the policy output and the second version of the policy output; and causing the report to be transmitted to a user device.

17. The method of claim 16, wherein causing the report to be transmitted to the user device comprises causing the report to be presented in a website that presents a dashboard related to a set of security policies.

18. The method of claim 15, further comprising:

designating each of the one or more differences between the first version of the policy output and the second version of the policy output as one of a plurality of types of changes; and determining, for each of the one or more differences, the severity characteristic based on the type of change associated with the difference.

19. The method of claim 18, wherein the severity characteristic is retrieved from a table that associates a severity characteristic with each of the plurality of types of changes.

20. The method of claim 15, further comprising:

obtaining additional system input comprising a third version of the policy output;

generating a second severity characteristic that indicates a severity of deploying the third version of the policy output to the one of the plurality of clouds based on one or more differences between the second version of the policy output and the third version of the policy output;

determining whether to deploy the third version of the policy output based on the second severity characteristic; and in response to determining that the third version of the policy output is not to be deployed, causing a report that indicates the one or more differences to be transmitted to a user device.

* * * * *